(12) United States Patent
Kim et al.

(10) Patent No.: US 9,070,179 B2
(45) Date of Patent: Jun. 30, 2015

(54) METHOD AND APPARATUS FOR SELECTIVELY ENCODING/DECODING SYNTAX ELEMENTS, AND APPARATUS AND METHOD FOR IMAGE ENCODING/DECODING USING SAME

(75) Inventors: Sunyeon Kim, Seoul (KR); Byeungwoo Jeon, Gyeonggi-do (KR); Jungyoup Yang, Seoul (KR); Kwanghyun Won, Gyeonggi-do (KR); Joohee Moon, Seoul (KR); Yunglyul Lee, Seoul (KR); Haekwang Kim, Seoul (KR)

(73) Assignee: SK TELECOM CO., LTD, Seoul (KR)

( * ) Notice: Subject to any disclaimer, the term of this patent is extended or adjusted under 35 U.S.C. 154(b) by 0 days.

(21) Appl. No.: 13/190,265

(22) Filed: Jul. 25, 2011

(65) Prior Publication Data

US 2011/0317930 A1 Dec. 29, 2011

Related U.S. Application Data

(63) Continuation-in-part of application No. PCT/KR2010/000248, filed on Jan. 15, 2010.

(30) Foreign Application Priority Data

Jan. 23, 2009 (KR) .................. 10-2009-0006308

(51) Int. Cl.
*G06K 9/36* (2006.01)
*G06T 9/00* (2006.01)
(Continued)

(52) U.S. Cl.
CPC *G06T 9/00* (2013.01); *H04N 19/52* (2014.11); *H04N 19/51* (2014.11); *H04N 19/103* (2014.11); *H04N 19/107* (2014.11)

(58) Field of Classification Search
CPC ...... G06T 9/00; H04N 19/103; H04N 19/107; H04N 19/51; H04N 19/52
USPC ........ 375/240.16, 240.24, E07.104, E07.115, 375/E07.123, 204.29; 348/699, 700, 402, 348/416, 413, 719; 382/233, 236, 239
See application file for complete search history.

(56) References Cited

U.S. PATENT DOCUMENTS 5,557,331 A * 9/1996 Honjo ...................... 375/240.15
6,175,593 B1 * 1/2001 Kim et al. ................ 375/240.17
(Continued)

FOREIGN PATENT DOCUMENTS

JP 2004-208258 7/2004
KR 10-2006-0042485 5/2006
(Continued)

OTHER PUBLICATIONS

Haskell, Barry G., Puri, Atul, Netravali, Arun N, Digital Video: An Introduction to MPEG-2 section 8.4.4, p. 164.*
(Continued)

*Primary Examiner* — Mekonen Bekele
(74) *Attorney, Agent, or Firm* — Lowe Hauptman & Ham, LLP

(57) ABSTRACT

An apparatus and a method for motion vector encoding/decoding, and to an apparatus and a method for image encoding/decoding using same are provided. The apparatus includes a selector of optimal predicted motion vector PMV from candidate motion vector set of current block; a determiner of motion vector prediction mode of current block with selected motion vector prediction mode from multiple motion vector prediction modes by decision criterion prearranged with motion vector decoding apparatus; and an encoder for determining, by determined motion vector prediction mode, optimal PMV or default predicted motion vector into PMV for current motion vector, encoding differential vector between the current block and PMV, and selectively encoding/outputting determined motion vector prediction mode as encoded motion vector prediction mode by the determined motion vector prediction mode. Bit quantity in encoding a motion vector is reduced improving encoding efficiency and preventing decoder crash even at encoding error, improving decoder.

6 Claims, 18 Drawing Sheets

(51) Int. Cl.
*H04N 19/52* (2014.01)
*H04N 19/51* (2014.01)
*H04N 19/103* (2014.01)
*H04N 19/107* (2014.01)

(56) References Cited

U.S. PATENT DOCUMENTS

| | | | | |
|---|---|---|---|---|
| 6,404,817 | B1* | 6/2002 | Saha et al. | 375/240.27 |
| 6,947,603 | B2* | 9/2005 | Kim | 382/236 |
| 7,733,960 | B2* | 6/2010 | Kondo et al. | 375/240.16 |
| 7,840,082 | B2* | 11/2010 | Lin et al. | 382/236 |
| 7,961,789 | B2* | 6/2011 | Hwang et al. | 375/240.16 |
| 8,379,733 | B2* | 2/2013 | Lee et al. | 375/240.26 |
| 2002/0041699 | A1* | 4/2002 | Kim | 382/107 |
| 2004/0091048 | A1* | 5/2004 | Youn | 375/240.16 |
| 2004/0247031 | A1* | 12/2004 | Hagai et al. | 375/240.16 |
| 2007/0217513 | A1* | 9/2007 | Lopez et al. | 375/240.16 |
| 2007/0297510 | A1* | 12/2007 | Herpel et al. | 375/240.15 |
| 2008/0063077 | A1* | 3/2008 | Kondo et al. | 375/240.16 |
| 2008/0063290 | A1* | 3/2008 | Lin et al. | 382/236 |
| 2008/0107180 | A1 | 5/2008 | Lee et al. | |
| 2008/0170616 | A1* | 7/2008 | Hwang et al. | 375/240.16 |
| 2009/0016443 | A1* | 1/2009 | Kim et al. | 375/240.24 |
| 2010/0158121 | A1* | 6/2010 | Wang et al. | 375/240.16 |
| 2012/0207220 | A1* | 8/2012 | Kim et al. | 375/240.16 |
| 2012/0230421 | A1* | 9/2012 | Chen et al. | 375/240.18 |

FOREIGN PATENT DOCUMENTS

| | | | |
|---|---|---|---|
| KR | 10-2007-0093305 | 9/2007 | |
| WO | WO 2004091222 A1 * | 10/2004 | H04N 7/32 |
| WO | 2010/085064 | 7/2010 | |

OTHER PUBLICATIONS

International Search Report mailed Jul. 30, 2010 for PCT/KR2010/000248.

* cited by examiner

| slice_header( ){ | C | Descriptor |
|---|---|---|
| ...... | | |
| num_mvop_flag_minus1 | 2 | u(v) |
| for(i=0;i<=num_mvop_flag_miuns1;i++){ | | |
| mvop_flag[i] | 2 | u(1) |
| } | | |
| ...... | | |
| } | | |

| header() |
|---|
| num_together_flag_minus1 |
| for(i=0; i<= num_together_flag_minus1;i++){ |
| together_flag[i] |
| } |

| trailer() |
|---|
| num_together_flag_minus1 |
| for(i=0; i<= num_together_flag_minus1;i++){ |
| together_flag[i] |
| } |

*FIG. 12*

METHOD AND APPARATUS FOR SELECTIVELY ENCODING/DECODING SYNTAX ELEMENTS, AND APPARATUS AND METHOD FOR IMAGE ENCODING/DECODING USING SAME

CROSS-REFERENCE TO RELATED APPLICATIONS

This application is a Continuation-In-Part (CIP) Application of International Application No. PCT/KR2010/000248, filed on Jan. 15, 2010, which claims the priority of Korean Patent Application No. 10-2009-0006308, filed on Jan. 23, 2009 in the KIPO (Korean Intellectual Property Office), the disclosures of to which are incorporated by reference herein in their entirety.

BACKGROUND OF THE INVENTION

1. Field of the Invention

The present disclosure relates to an apparatus and a method for selectively encoding/decoding syntax elements, and to an apparatus and a method for encoding/decoding images using the same.

2. Description of the Related Art

The statements in this section merely provide background information related to the present disclosure and may not constitute the prior art.

As multimedia technologies are developed in rapid progress, demand is growing for quality multimedia data including audio, image, and video. Accordingly, for meeting the demand to transmit, store, and retrieve such multimedia data within a limited network environment, international standards are being established for high efficiency video compression. Specifically, in case of videos, ISO/IEC JTC1/SC29MPEG group and ITU-T VCEG group have created H.264/AVC MPEG-4 Part. 10 standard, which attempts to achieve a high compression efficiency by using various prediction encoding methods such as variable block size motion estimation and compensation, intra prediction encoding, etc. The prediction encoding is an effective method to reduce correlations in existence between data and it is widely used for compressing various types of data. Especially, because motion vectors have high correlations with motion vectors of adjacent blocks, it is possible to first calculate a prediction value or predicted motion vector (PMV) for a motion vector of a current block from motion vectors of adjacent blocks and then encode not the true values of the motion vectors of the current block but just a differential value or differential motion vector (DMV) relative to the prediction value and thereby substantially reduce the bit quantity to improve the coding efficiency.

Generally, in efforts towards an effective compression for the encoding of a motion vector using such a predicted motion vector, more accurately predicted motion vectors proportionally improve the coding efficiency. Therefore, a possible way of improving the efficiency of the predicted encoding is to generate a finite number of predicted motion vector targets comprised of not only the motion vectors of just the spatially adjacent blocks but also motion vectors of temporally, spatially, or spatio-temporally adjacent blocks or their combined calculations into further motion vectors and to select among the generated motion vector targets the most appropriate one for the prediction encoding of the motion vectors. In this occasion, to correctly reconstruct the original motion vector from the prediction based encoded motion vector data, it is necessary to know which one of the finite number of the predicted motion vectors was used. The simplest motion vector prediction encoding method for the task is to additionally encode information on the correct predicted value used to perform the prediction encoding of the motion vectors. Alternatively, to reduce the bit quantity required to encode additional information for indicating such selection of the predicted motion vector, the current H.264/AVC standard uses medians of respective horizontal components and vertical components of the motion vectors contained in the adjacent blocks (at left, upper, and upper right sides of the current block) as the predicted motion vectors (PMV) for the prediction encoding of the motion vectors. This method determines a predetermined default method in the form of a median, commonly recognized in the encoding and decoding operations and produces the prediction value (predicted motion vector) using the default method and thereby obviates the need for additionally encoding information on the used prediction value. The conventional method of predefining the default method of the median for use is only as good as saving an additional information transmission about identifying a motion vector used as the predicted motion vector, but is still deficient because the predicted motion vector that is actually the used median is not the best predicted motion vector to minimally generate the bit quantity required for encoding the differential motion vector.

Generally in video compressive encoding methods, there are provided diverse highly sophisticated encoding techniques subject to competition against each other and then a predetermined evaluation criteria is applied to select an encoding technique showing an optimal encoding efficiency, whereby increasing the encoding efficiency. Compressed data in this way follows a rule or protocol agreed between encoders and decoders to be stored or transmitted in the form of a bitstream which has components each called a syntax element. For example, in response to an encoder required to encode a motion vector in is performing a compressive encoding of a video by using the motion compensation method for removing temporal redundancy, different motion vectors are prepared within a search range before searching and finding an optimal motion vector and thereafter the decoder is informed by signaling of which one of the predicted motion vectors was used as described above. In this case, information for notifying what predicted motion vector is possibly used may be deemed to be an example of the syntax element. Alternatively, instead of simply relaying the possibly used predicted motion vector, an encoding may be made with respect to its difference from a certain predefined predicted motion vector such as the median. Instead, adaptively depending on different cases, differently predetermined predicted motion vectors may be used. In those cases, the method of selecting the predicted motion vectors should be also notified to the decoder and the notifying information may also become an example of the syntax element.

When it becomes necessary for the decoder to properly decode data compressed by using more diverse and sophisticated encoding methods, a large amount of syntax element information should be added to the bitstream. In such case, the necessary transmission or storage of the syntax element information accompanies an increased amount of bits and in turn increased amount of data needed to encode still images or videos. Besides, using more diverse and sophisticated encoding methods may improve the encoding efficiency, but a prerequisite for the proper decoding is to notify the decoder of the identity of the encoding method and how it was used. Therefore, the concerned information has to be transmitted or stored, whereby a possible improvement of the encoding efficiency obtained by using more sophisticated encoding methods may be defeated by an overhead from expressing or notifying the decoder of the identity of the possibly used encoding method to cause a higher cost of bits, that is, an effect of increased the syntax elements for signaling the same resultantly contributing to an actual degradation of the video compression performance.

One desirable solution to such a problem is to save the encoder from having to store or transmit a syntax element value it determined by a predetermined encoding criterion to the decoder by having the decoder by itself estimate the syntax element value through its own syntax element estimation process in the course of its decoding operation. However, this solution has a shortcoming that it is not applicable to general cases since decoders are made to carry out the very limited estimation process when encoders can make various decisions determinations. Therefore, the method is selectively applicable only to some cases where a syntax element determined by the encoder is equally estimated by the decoder autonomously. However, since the selective syntax transmission method that involves occasional absent transmissions and positive transmission at other times requires the decoder to determine the presence of a syntax element through the estimating process on a predetermined syntax element by using a previously decoded image value or the decoding process itself, a problem occurs that the step of parsing the syntax may not be separated from the decoding process. Moreover, if an error is contained in the result or process of decoding that is necessary in the course of the syntax element estimation, there is no way to ordinarily determine the presence of the syntax element and thus there is a concern that the decoder might mistakenly attempt a parsing on the corresponding syntax element without even receiving a transmission of the corresponding syntax element or determine the parsing is not needed even after receiving a transmission of the corresponding syntax element, which would cause a serious and critical disturbance in the parsing or decoding process. Against the perceived hardship, the present disclosure is to provide a method and an apparatus for resolving the chronic problem.

In addition, the present disclosure is to provide a method and an apparatus that gather equal syntax elements together by each of predetermined units and transmit them for improving the compression efficiency and simplifying the operations of the decoders.

Additionally, in order to achieve an improved efficiency and solve the above identified problem by precluding the selective transmission and storage of the syntax element, new a method of encoding/decoding such syntax element is needed. The present disclosure encompasses the method and apparatus for encoding/decoding the syntax elements of the still images and is videos to achieve the goal described.

SUMMARY OF THE INVENTION

Therefore, in order to resolve the described problem, the present disclosure is to permit a selection of predicted motion vector of a current motion vector by using multiple motion vector prediction modes to accurately refine the selection of the predicted motion vector, whereby decreasing the quantity of bits for encoding a differential vector and improving the performance of the motion prediction and/or motion compensation.

In addition, while allowing the encoding apparatus to provide the selection of the more accurately predicted motion vector toward the improved encoding efficiency the present disclosure selects not to directly inform the decoding apparatus of predicted motion vector used in its encoding and instead provides the decoding apparatus with information for finding the predicted motion vector or shares the information with the decoding apparatus and thereby alleviates the increase of the bit quantity from extra information for the notification of the predicted motion vector to improve the encoding and decoding efficiencies further.

Furthermore, the present disclosure is to take advantage of the cases of knowing the presence of a syntax in a bitstream depending on the image reconstruction resulting from among syntax elements comprising the image bitstream and separates the process of parsing the syntax element from the decoding by having the decoder be separately informed of the number of those cases that are present (or absent) within a predetermined unit.

In addition, the present disclosure is to simplify the process of decoding by a single notification to the decoder of the number of the syntax elements through the grouped encoding of the equal syntax elements together and the corresponding values.

An aspect of the present disclosure provides a motion vector encoding apparatus including a predicted motion vector selector for selecting an optimal predicted motion vector from a candidate motion vector set of a current block; a prediction mode determiner for determining a motion vector prediction mode of the current block with a selected motion vector prediction mode from a plurality of motion vector prediction modes based on a decision criterion prearranged with a motion vector decoding apparatus; and an encoder in dependence on a determined motion vector prediction mode from the prediction mode determiner, for determining the optimal predicted motion vector or a default predicted motion vector into a predicted and determined motion vector for a current motion vector, encoding a differential vector between the current block and the predicted and determined motion vector, and selectively encoding and outputting the determined motion vector prediction mode as an encoded motion vector prediction mode depending on the determined motion vector prediction mode.

Here, if the differential vector between the current block and the predicted and determined motion vector is zero vector, the differential vector may not be encoded.

Here, the plurality of motion vector prediction modes may include a competing prediction mode and a non-competing prediction mode, and the prediction mode determiner may determine whether the motion vector prediction mode of the current block is the non-competing prediction mode based on the decision criterion prearranged with a motion vector decoding apparatus to make a selection between the competing prediction mode and the non-competing prediction mode into the motion vector prediction mode of the current block.

In addition, in an event that the optimal predicted motion vector is equal to the default predicted motion vector, the prediction mode determiner may determine the non-competing prediction mode as the motion vector prediction mode of the current block. At the same time, the event that the optimal predicted motion vector is equal to the default predicted motion vector may be one or more of a case where the candidate motion vector set contains no available candidate motion vectors for use as a predicted motion vector for the current motion vector of the current block, a case where there is one candidate motion vector, a case where candidate motion vectors are two or more but are identical overall, and a case where the optimal predicted motion vector is selected from two or more unequal candidate motion vectors and is identical to the default predicted motion vector.

In addition, the encoder may include a first encoder responsive to the determined motion vector prediction mode being a non-competing prediction mode, for determining the default predicted motion vector into the predicted and determined motion vector to generate and encode the differential vector; a second encoder responsive to the determined motion vector prediction mode being a competing prediction mode and in dependence on whether the motion vector decoding apparatus is capable of predicting the optimal predicted motion vector, for determining the optimal predicted motion vector or the default predicted motion vector into the predicted and determined motion vector to generate and encode the differential vector; and a third encoder responsive exclusively to the determined motion vector prediction mode being the competing prediction mode, for encoding the determined motion vector prediction mode.

In addition, the determined motion vector prediction mode may comprise one bit, and the competing prediction mode or the non-competing prediction mode may be represented by a bit value, and the encoded motion vector prediction mode may be inserted into a bitstream slice header or picture header.

Another aspect of the present disclosure provides a motion vector encoding method including: determining a motion vector prediction mode of a current block with a selected motion vector prediction mode from a plurality of motion vector prediction modes based on a decision criterion prearranged with a motion vector decoding apparatus; determining a predicted and determined motion vector for a current motion vector depending on selected motion vector prediction mode; encoding a differential vector between the current block and the predicted and determined motion vector into an encoded differential vector; selectively encoding a determined motion vector prediction mode from the step of determining the motion vector prediction mode depending on the determined motion vector prediction mode; and generating and outputting a bitstream including the encoded differential vector and an encoded motion vector prediction mode from the step of selectively encoding the determined motion vector prediction mode.

Yet another aspect of the present disclosure provides a motion vector decoding apparatus including: a differential vector decoder for decoding an encoded differential vector through determining whether a motion vector prediction mode of a current block is a non-competing prediction mode according to a decision criterion prearranged with a motion vector encoding apparatus to reconstruct and output a differential vector; a prediction mode decoder for decoding an encoded motion vector prediction mode to reconstruct and output the motion vector prediction mode; a first predicted motion vector determiner responsive to the motion vector prediction mode of the current block being the non-competing prediction mode for determining a default predicted motion vector into a predicted and determined motion vector for a current motion vector; a second predicted motion vector determiner responsive to the motion vector prediction mode of the current block not being the non-competing prediction mode and in dependence on a reconstructed motion vector prediction mode from the prediction mode decoder, for determining an optimal predicted motion vector or the default predicted motion vector into the predicted and determined motion vector for the current motion vector; and a motion vector reconstructor for reconstructing the current motion vector by adding the predicted and determined motion vector to a reconstructed differential vector from the differential vector decoder.

Yet another aspect of the present disclosure provides a motion vector decoding method including: reconstructing a motion vector prediction mode and a differential vector by decoding an encoded motion vector prediction mode and an encoded differential vector; determining whether a motion vector prediction mode of a current block is a non-competing prediction mode according to a decision criterion prearranged with a motion vector encoding apparatus; determining a default predicted motion vector into a predicted and determined motion vector for a current motion vector if the motion vector prediction mode having been determined is the non-competing prediction mode; if the motion vector prediction mode having been determined is not the non-competing prediction mode but a competing prediction mode, determining the predicted and determined motion vector for the current motion vector of the current block with the default predicted motion vector or an optimal predicted motion vector selected from a candidate motion vector set based on a reconstructed motion vector prediction mode from the step of reconstructing the motion vector prediction mode; and reconstructing the current motion vector by adding the predicted and determined motion vector to the differential vector.

Here, the encoded motion vector prediction mode may include a bit for representing the number of motion vector prediction modes and another bit for representing the same number of the motion vector prediction modes, and the motion vector decoding method may determine whether all motion vectors are normally reconstructed by comparing between the number of the motion vector prediction modes and the number of blocks included in the entire blocks reconstructed within a current slice or a current picture and allotted to the competing prediction mode.

Yet another aspect of the present disclosure provides an encoding method including: selectively encoding a syntax element in respective units of a block into an encoded syntax element; and inserting the encoded syntax element in a predetermined area of an upper unit including one or more blocks, wherein the encoded syntax element contains information on the number of the blocks having been encoded depending on the syntax element.

Here, the upper unit may be a slice or a picture, and the predetermined area of the upper unit may be a header or a trailer of the upper unit.

Yet another aspect of the present disclosure provides a decoding method including: decoding a syntax element after an encoding performed selectively in respective units of a block, into a decoded syntax element, the syntax element after the encoding being inserted in a predetermined area of an upper unit including one or more blocks and containing information on the number of the blocks with the syntax element having been encoded; determining whether each of the blocks included in the upper unit needs to be assigned the syntax element; decoding the blocks assigned the syntax element as is determined, depending on the decoded syntax element; and comparing between the number of the blocks having been decoded and the information on the number of the blocks contained in the syntax element after the encoding. The step of comparing may help to determine the normal decoding performed in the decoding apparatus.

Here, the upper unit may be a slice or a picture, and the predetermined area of the upper unit may be a header or a trailer of the upper unit.

According to the present disclosure as described above, thanks to the ability to select the near actual motion vector for use in predicting an image block, the required bit quantity for encoding the motion vector can be decreased to improve the encoding efficiency, and moreover even with an occurrence of error occurred in the decoding process such as a transmission error, the decoding apparatus can autonomously determine the occurrence of error and perform a subsequent measure for concealing the error or otherwise handling the same, preventing the decoder from getting into a disorder and thereby improving the performance of the decoder.

BRIEF DESCRIPTION OF THE DRAWINGS

The drawings described herein are for illustration purposes only and are not intended to limit the scope of the present disclosure in any way.

FIG. 12 is an exemplary diagram showing the number of motion vector prediction modes and a rule for collectively encoding the motion vector prediction modes according to an aspect.

DETAILED DESCRIPTION OF THE INVENTION

Figure 1:
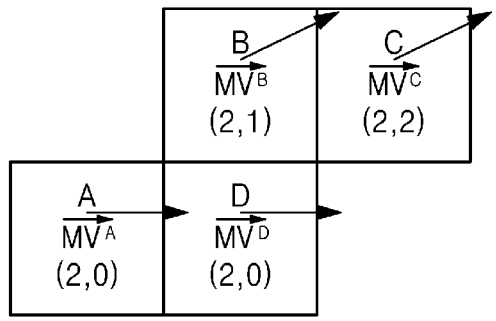
FIG. 1 is an exemplary diagram showing blocks for encoding motion vectors to be encoded according to an aspect.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

In the following description, a video encoding apparatus, a video decoding apparatus, a motion vector encoding apparatus, and a motion vector decoding apparatus to be mentioned respectively may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding or decoding videos or various programs for encoding or decoding motion vectors and related data, and a microprocessor for executing the programs to effect operations and controls.

In addition, the video encoded into bitstreams by the video encoding apparatus or the motion vector encoding apparatus may be transmitted in real time or non-real-time to the video decoding apparatus or the motion vector decoding apparatus where it is reconstructed and reproduced into the video or motion vectors via a wired/wireless communication network including the Internet, a short range wireless communication network, a wireless LAN network, WiBro (Wireless Broadband) also known as WiMax network, and mobile communication network or a communication interface such as cable, USB (universal serial bus), or other various means.

FIG. 1 is an exemplary diagram showing blocks for encoding motion vectors to be encoded according to an aspect.

In FIG. 1, block D is a "current block" corresponding to a motion vector to be encoded, and block A, block B, and block C are "adjacent blocks" with respect to block D. Referring to FIG. 1, $MV^A$, $MV^B$, $MV^C$, and $MV^D$ are motion vectors (MV) of block A, block B, block C, and block D, respectively, and they are respectively defined as having horizontal components ($MV^A_x$, $MV^B_x$, $MV^C_x$, and $MV^D_x$) and vertical components ($MV^A_y$, $MV^B_y$, $MV^C_y$, and $MV^D_y$). As used herein, the motion vector $MV^D$ of the current block, block D, is called a current motion vector.

$$PMV^D = \begin{bmatrix} PMV^D_x \\ PMV^D_y \end{bmatrix} = \begin{bmatrix} F(MV^A_x, MV^B_x, MV^C_x) \\ F(MV^A_y, MV^B_y, MV^C_y) \end{bmatrix} \quad \text{Equation 1}$$

Reviewing Equation 1, it can be seen that a predicted motion vector $PMV^D$ for the current motion vector can be calculated using a particular function F( ), wherein motion vectors $MV^A$, $MV^B$, and $MV^C$ of adjacent blocks A, B, and C are used as variables of the particular function F( ).

In H.264/AVC standard, the predicted motion vector $PMV^D$ for the current motion vector is calculated with a function for calculating a median used as the particular function F( ). In other words, the predicted motion vector $PMV^D$ for the current motion vector is obtained as the median of the motion vectors $MV^A$, $MV^B$, and $MV^C$ of the adjacent blocks A, B, and C. Calculated in this way, the predicted motion vector $PMV^D$ for the current motion vector $MV^D$ is expressed as Equation 2 below.

$$PMV^D = \begin{bmatrix} PMV_x^D \\ PMV_y^D \end{bmatrix} = \begin{bmatrix} \text{median}(MV_x^A, MV_x^B, MV_x^C) \\ \text{median}(MV_y^A, MV_y^B, MV_y^C) \end{bmatrix} \quad \text{Equation 2}$$

When Equation 1 (or Equation 2) used gives the predicted motion vector $PMV^D$ of the current motion vector $MV^D$, Equation 3 may be used to obtain a differential motion vector $DMV^D$ generated by subtracting the predicted motion vector $PMV^D$ from its current motion vector $MV^D$ desired to be compressed, and the differential motion vector $DMV^D$ is then encoded by a predefined method such as an entropy encoding for transmission.

$$DMV^D = MV^D - PMV^D = \begin{bmatrix} MV_x^D - PMV_x^D \\ MV_y^D - PMV_y^D \end{bmatrix} \quad \text{Equation 3}$$

As illustrated in FIG. 1, if the current motion vector $MV^D$ is valued (2, 0) with Equation 2 used for conventionally calculating the median as the predicted motion vector $PMV^D$, its predicted motion vector $PMV^D$ becomes (2, 1).

This vector encoding method using a median as the predicted motion vector has the encoding apparatus and decoding apparatus mutually understand using the median for calculation of the predicted motion vector, so as to obviate the need to encode and transmit additional information on the identification of motion vectors used as the predicted motion vector for the current motion vector, and hence improves the encoding efficiency. Herein, the encoding apparatus is intended to encompass a motion vector encoding apparatus and a video encoding apparatus, and decoding apparatus is intended to encompass a motion vector decoding apparatus and a video decoding apparatus. The motion vector encoding apparatus, motion vector encoding apparatus, video decoding apparatus, and video decoding apparatus will be described in detail in the steps to follow.

However, as noted above, the predicted motion vector $PMV^D$ calculated by using the median may differ from the original current motion vector $MV^D$. It is noted from the example of FIG. 1 that the predicted motion vector $PMV^D$ of (2, 1) calculated by using the median is different from the current motion vector $MV^D$ of (2, 0), and an attempt to use Equation 3 for differential motion vector $DMV^D$ will yield a differential motion vector to be encoded of $DMV^D$ that is (0, −1).

Instead, if the block A motion vector $MV^A$ of (2, 0) is used as the predicted motion vector $PMV^D$, there is no difference occurred with respect to the original current motion vector $MV^D$ of (2, 0), and executing Equation 3 for the differential motion vector $DMV^D$ will yield a differential motion vector $DMV^D$ to be encoded into (0, 0). In other words, compared with using the median to have the predicted motion vector $PMV^D$ calculated as (2, 1), applying the block A motion vector $MV^A$ of (2, 0) as the predicted motion vector $PMV^D$ to have the differential motion vector $DMV^D$ of (0, 0) can effectively reduce the bit quantity needed to encode the same.

However, in a method using the median, the median is always a must for calculation of the predicted motion vector $PMV^D$ of the current motion vector $MV^D$, which makes it impossible to adopt the block A motion vector $MV^A$ for use as the predicted motion vector $PMV^D$. Even if the block A motion vector $MV^A$ is used as the predicted motion vector $PMV^D$, it is necessary to prepare and deliver extra information about which one of motion vectors $MV^A$, $MV^B$, and $MV^C$ is used as the predicted motion vector $PMV^D$, in which the encoding of the extra information counteracts the efforts to secure a better compression efficiency.

Accordingly, in an aspect of the present disclosure, multiple motion vector prediction modes are used to enable a more exact selection of a predicted motion vector whereby resolving problems from selecting the median as the predicted motion vector. Further, in an aspect of the present disclosure, not only a more exact selection of a predicted motion vector improves the encoding efficiency, but also an effective method is offered to inform the decoding apparatus of the prediction motion vector having been selected in order to solve the problems of the increased quantity of bits due to the encoding of the additional information to tell about the predicted motion vector. Additionally, in an aspect, the motion vector prediction mode is omitted in certain condition from a bitstream which is then transmitted or stored to improve the encoding efficiency while parsing of the bitstream is allowed at the decoding apparatus so that it is stable in operation. Here, the motion vector prediction mode refers to such motion vector prediction mode adapted to identify the manner of predicting the motion vector.

The illustration in FIG. 1 of blocks A, B, C, D and their respective motion vectors $MV^A$, $MV^B$, $MV^C$, and $MV^D$ will be generally used throughout descriptions to follow. However, although the motion vectors $MV^A$, $MV^B$, $MV^C$, and $MV^D$ are conveniently depicted as 2-dimensional vectors with their vertical and horizontal components in FIG. 1, it is not so limited but may be extended to encompass n-dimensional motion vectors for application. In addition, the depiction of FIG. 1 uses only three spatially adjacent blocks A, B, and C with respect to the current block at D just for the sake of convenience although there may be one or more temporally or spatially adjacent blocks in their places.

The motion vector prediction mode according to an aspect includes a competing prediction mode and a non-competing mode. Here, the competing prediction mode means a mode where there are various methods for predicting the current motion vector are competing against each other, and the non-competing prediction mode represents a mode having no different methods for predicting the current motion vector but only one to use.

If there are no available candidate motion vectors for use as the predicted motion vector for the current motion vector or there is just one of those or there are one or more candidate motion vectors which are identical, the non-competing prediction mode is decided to be the motion vector prediction mode. This is because the encoding apparatus and the decoding apparatus by themselves can identify the same candidate motion vector used as the predicted motion vector without needing an additional information exchange therebetween for the same purpose.

In addition, even if there are multiple candidate motion vectors with differences between them and if an optimal predicted motion vector selected through a predetermined process is identical to a predetermined default predicted motion vector such as the median described through Equation 2, the non-competing prediction mode also is decided to be the motion vector prediction mode. This is based on the ability of the decoding apparatus to obtain the predetermined default predicted motion vector such as the median autonomously and then perform an automatic check whether the default predicted motion vector is equal to an optimal predicted motion vector predicted through a predetermined process, and an autonomous knowledge by the decoding apparatus in such equality to use the default predicted motion vector as the predicted motion vector without having to exchange extra information with the encoding apparatus.

In other words, if the motion vector prediction mode is non-competing prediction mode, the decoding apparatus can independently see the motion vector prediction mode as the non-competing prediction mode and can determine the default predicted motion vector is good for use as the predicted motion vector. Therefore, this decision of the non-competing prediction mode may be called a non-competing occasion where the decoding apparatus can have an independent knowledge that the default predicted motion vector is right for use as the predicted motion vector and that the current block falls under the non-competing prediction mode, saving the encoding apparatus from extra efforts to encode and transmit information that the current block is the non-competing prediction mode. That is, in this case, the motion vector prediction mode needs not to be encoded and transmitted.

On the other hand, in the above mentioned occasion besides the non-competing prediction mode (hereinafter called a 'competing occasion'), the decoding apparatus is ignorant of which one of the candidate motion vectors was used as the predicted motion vector unless it receives additional information from the encoding apparatus which is thus required to further encode and transmit the relevant information. Thus, the motion vector prediction mode that is categorized under the competing occasion is called the competing prediction mode. In this case, the current block that belongs to the competing prediction mode must be informed by additionally encoding and transmitting information which tells which one of the candidate motion vectors is right for the decoding apparatus to use as the predicted motion vector in reconstructing the current motion vector. For example, the additional information may be an instruction for the decoding apparatus in reconstructing the current motion vector to use either a motion vector selected from candidate motion vectors by a predetermined criterion or method (either an optimal predicted motion vector) or a default predicted motion vector predefined such as the median or the value of a motion vector at an upper, left side or other neighboring location, which represents the motion vector prediction mode.

As used herein, the optimal predicted motion vector is just to name a predicted motion vector that is obtained from the current motion vector by a predetermined criterion or method rather than saying that such predicted motion vector obtained has an always optimal predicted value. In addition, if the additional information is to use the optimal predicted motion vector, it indicates the occasion that the encoding apparatus determines the predictability of the optimal predicted motion vector by the decoding apparatus, which represents and is called a predictable occasion and may express the motion vector prediction mode by a single bit of flag which is indicated as '1', for example. In addition, if the additional information is to use the default predicted motion vector, it indicates the occasion that the encoding apparatus determines the unpredictability of the optimal predicted motion vector by the decoding apparatus, which represents and is called an unpredictable occasion and may express the motion vector prediction mode by a single bit of flag which is indicated as '0', for example.

Figure 2:
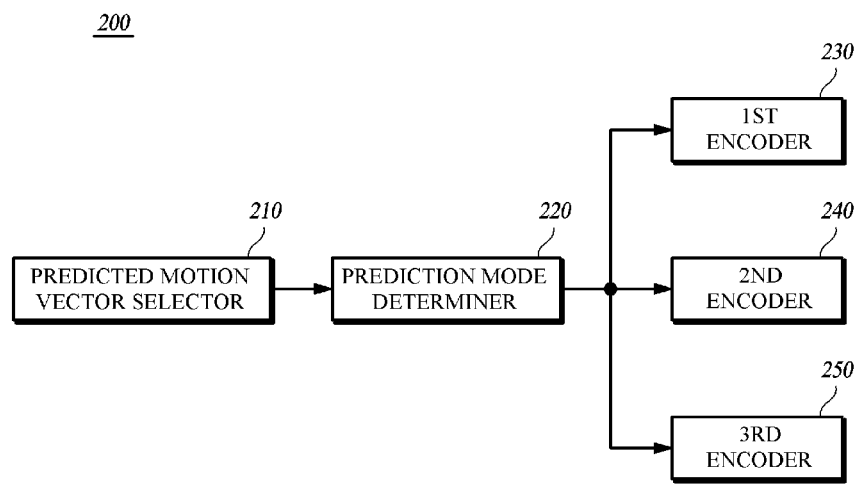
FIG. 2 is a schematic block diagram showing a motion vector encoding apparatus according to an aspect.

FIG. 2 is a schematic block diagram showing a motion vector encoding apparatus 200 according to an aspect.

Referring to FIG. 2, motion vector encoding apparatus 200 according to an aspect includes a predicted motion vector selector 210, a prediction mode determiner 220, a first encoder 230, a second encoder 240, and a third encoder 250.

Predicted motion vector selector 210 defines a candidate motion vector set that is candidate motion vectors grouped for use as a predicted motion vector with respect to a current motion vector of a current block, and selects the predicted motion vector from the defined candidate motion vector set. There are various possible methods for selecting the predicted motion vector from the defined candidate motion vector set such as by selecting the candidate motion vector with a minimized difference from the current motion vector as the predicted motion vector. Thus, the predicted motion vector selected from the candidate motion vector set by predicted motion vector selector 210 will be conveniently called an optimal predicted motion vector hereinafter. However, this is merely to define a specific example to facilitate the description, and the optimal predicted motion vector as used in the disclosed aspect means the predicted motion vector that is obtained from the current motion vector by a predetermined criterion or method.

Prediction mode determiner 220 makes a judgment whether to use the optimal predicted motion vector selected by predicted motion vector selector 210 to reconstruct the current motion vector in a motion vector decoding apparatus or to use a default predicted motion vector for the same purpose, accordingly determine a selection between a competing prediction mode and a non-competing prediction mode as a motion vector prediction mode. At this time, if the motion vector prediction mode is equivalent to the non-competing prediction mode, the motion vector decoding apparatus can see whether the block to be decoded is equivalent to the non-competing prediction mode and thereby save the otherwise necessary encoding and transmission of the motion vector prediction mode to increase the compression efficiency.

Here, prediction mode determiner 220, in response to the optimal predicted motion vector selected by predicted motion vector selector 210 being equal to the default predicted motion vector, determines the non-competing prediction mode as the motion vector prediction mode of the current block. Determining the non-competing prediction mode as the current block motion vector prediction mode occurs not only when the optimal predicted motion vector or the selected one of a plurality of different candidate motion vectors is identical to the default predicted motion vector but also when there are no available candidate motion vectors for selection as the predicted motion vector, there are just a single candidate motion vector available, and there are more than two candidate motion vectors which are identical. This is because these occasions of lacking an available candidate motion vector for the predicted motion vector selector 210 to use as the predicted motion vector (in this case, absence of a candidate motion vector for use as the predicted motion vector may permit all available candidate motion vectors to be defined as (0,0)) or a single candidate motion vector being present or multiple candidate motion vectors being identical overall would make both of motion vector encoding apparatus 200 and the motion vector decoding apparatus search for a common optimal predicted motion vector which will be same as the default predicted motion vector.

Therefore, in the non-competing occasion described, motion vector encoding apparatus 200 and the motion vector decoding apparatus may select the same predicted motion vector by sharing a predetermined decision process that generates the same result even from selecting the optimal predicted motion vector through any prediction modes. In such non-competing occasion, a differential vector, the difference between the current motion vector and the predicted motion vector is encoded by first encoder 230.

First encoder 230 operates, in response to prediction mode determiner 220 determining the motion vector prediction mode as the non-competing prediction mode, to determine the default motion prediction vector as the predicted motion vector for the current motion vector and calculate the differential vector between the predicted motion vector and the current motion vector and encode the calculated differential vector.

At this time, if the differential vector is zero vector, it may not be encoded.

Second encoder 240 operates, in response to prediction mode determiner 220 determining the motion vector prediction mode as the competing prediction mode, to determine the predicted motion vector for the current motion vector by using the predicted motion vector, i.e. the optimal predicted motion vector (where the motion vector prediction mode has bit flag valued '1' for example) as determined by a bit flag value of the same motion vector prediction mode determined in prediction mode determiner 220 or by using a predefined default predicted motion vector such as a median (for example, where the motion vector prediction mode has bit flag valued '0') and calculate the differential vector between the predicted motion vector and the current motion vector and encode the calculated differential vector.

Third encoder 250 selectively encodes motion vector prediction modes of blocks which are unitized into slices, pictures, etc. and especially have their motion vector prediction modes determined by prediction mode determiner 220 as the competing prediction modes. The separation of such blocks with their motion vector prediction mode determined as the competing prediction modes from the blocks in the predetermined unit to encode the separate blocks is in preparation for parsing from a bitstream by the motion vector encoding apparatus with respect to a motion vector prediction mode that belongs to the competing prediction mode so that the parsing process is carried out independently of the process of decoding for reconstructing the current motion vector or texture information of a block.

In other words, third encoder 250 collectively encodes motion vector prediction modes which are present in a predetermined upper unit of encoding (including slice unit or picture unit and called 'upper unit') than a certain encoding unit (for example, macroblock unit or block unit). At this time, the upper unit may be the slice unit though it may be higher than the picture unit above the slice unit.

Here, in the process of encoding the motion vector prediction mode, third encoder 250 encodes a first information identifier of the number of the motion vector prediction modes belonged to the block and decided to be competing prediction modes, that is, the number of the motion vector prediction modes transmitted or stored and a second information identifier of information (bit flag indicative of the motion vector prediction mode) for identifying the motion vector prediction modes in that number, wherein the first identifier may be, for example, a bit value and indicated by "num_mv_mode_flag_minus1" which is the total number less one in FIG. 12 and the second identifier may be, for example, an arrangement of bit values of bit flags and indicated by "mv_mode_flag[i], 0≤i≤num_mv_mode_flag_minus1" in FIG. 12. At this time, third encoder 250 may use encoding techniques such as an entropy encoding or various lossless compression methods in encoding and thus compressing the information identifier of the number of the motion vector prediction modes and the information for identifying the motion vector prediction modes in that number, although they may be transmitted without the compression.

Encoded by first encoder 230 or second encoder 240, a differential vector is inserted into the bitstream so is the motion prediction mode encoded by third encoder 250. To this end, the differential vector decoded by a multiplexer and an encoded motion prediction mode may be inserted into the bitstream although it is not shown in FIG. 2. However, the insertion of the motion prediction mode encoded by third encoder 250 into the bitstream may precede the insertion of the differential vector and into different headers depending on the upper unit. For example, the insertion may be into the slice header if the upper unit is the slice unit and the picture header if the upper unit is the picture unit.

The bitstream encoded in this way is transmitted by wire or wirelessly or other transmission channels including storage medium to a motion vector decoding apparatus to undergo a decoding process.

Figure 3:
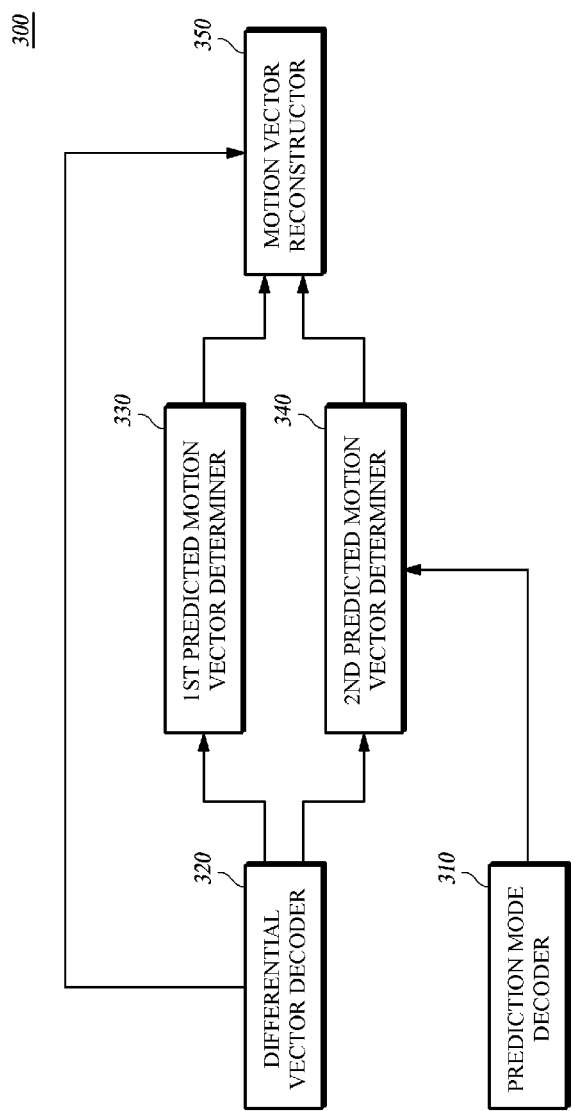
FIG. 3 is a block diagram showing a motion vector decoding apparatus according to an aspect.

FIG. 3 is a block diagram showing a motion vector decoding apparatus 300 according to an aspect.

Referring to FIG. 3, motion vector decoding apparatus 300 according to an aspect may include a prediction mode decoder 310, a motion vector prediction mode determiner and differential vector decoder 320, a first predicted motion vector determiner 330, a second predicted motion vector determiner 340, and a motion vector reconstructor 350.

The encoded motion vector prediction mode and the encoded differential vector both processed by motion vector encoding apparatus 200 and inserted into the bitstream decoded in predetermined different units which are prearranged between motion vector encoding apparatus 200 and motion vector decoding apparatus 300. Specifically, the encoded motion vector prediction mode is decoded in the upper unit, and the encoded differential vector is decoded in its lower unit or in units of a block.

To this end, although not shown in FIG. 3, a demultiplexer is used to differentiate the encoded motion vector prediction mode and the encoded differential vector from the bitstream, the motion vector prediction mode encoded in the upper unit is inputted to prediction mode decoder 310, and the differential vector encoded for each block is inputted to the motion vector prediction mode determiner and differential vector decoder 320. If the current block was encoded in SKIP mode, there is no differential vector present and thus the motion vector prediction mode determiner and differential vector decoder 320 sees no encoded differential vector inputted.

Prediction mode decoder 310 decodes the encoded motion vector prediction modes of the blocks allotted to the competing prediction mode within the upper unit to generate reconstructed motion vector prediction modes for output, and the outputted motion vector prediction modes are stored in a storage media such as a memory until they are sequentially read one by one each time second predicted motion vector determiner 340 determines the predicted motion vector of each block, whereby having the motion vectors determined by the sequentially read motion vector prediction modes eventually determined as the predicted motion vectors of respective blocks. At this time, the reconstructed motion vector prediction mode includes bits for indicating the number of motion vector prediction modes and bits for identifying the motion vector prediction modes in that number, thus prediction mode decoder 310 first reads the bits for indicating the number of motion vector prediction modes to get the same number and then reads in the bits for identifying the motion vector prediction modes in that number by reading the bits in that number one by one, whereby parsing the motion vector prediction modes to have just the bits for indicating the parsed motion vector prediction modes outputted and stored.

In addition, prediction mode decoder 310, in response to the motion vector prediction modes corresponding to the upper unit as classified in the bitstream being expressed as shown in FIG. 12 without going through an extra compression process such as the entropy encoding, proceeds through the parsing to reconstruct the motion vector prediction mode while, if the entropy encoding or other lossless compressive encoding was involved, it inversely takes the appropriate steps of respective encoding methods to reconstruct the motion vector prediction modes. In either occasion, such motion vector prediction mode decoding process is performed independently of the previous or following decoding process (for example, decoding of the encoded differential vector or encoded texture information).

Differential vector decoder 320 uses the predetermined decision process shared between motion vector encoding apparatus 200 and motion vector decoding apparatus 300 to determine whether the motion vector prediction mode of the current block to be presently decoded is a non-competing prediction mode, and if not, conclude it is a competing prediction mode. Here, a method of differential vector decoder 320 for determining whether motion vector prediction mode of the current block is a non-competing prediction mode is same as or similar to how prediction mode determiner 220 makes decision as described referring to FIG. 2, and the detailed description is omitted. In addition, differential vector decoder 320 decodes the encoded differential vector to reconstruct the differential vector of the current block. At this time, if differential vector decoder 320 finds no encoded differential vector as in the encoding in the SKIP mode, it outputs (0, 0) as the decoded differential vector.

In addition, differential vector decoder 320, in response to the motion vector prediction mode of the current block being the non-competing prediction mode, notifies first predicted motion vector determiner 330 of the fact to determine the default predicted motion vector as the predicted motion vector of the current block while, in response to the motion vector prediction mode of the current block being a competing prediction mode, notifies second predicted motion vector determiner 340 of the fact to determine a motion vector that is determined by the reconstructed motion vector prediction mode as the predicted motion vector of the current block.

First predicted motion vector determiner 330 operates if the current block is in the non-competing prediction mode to determine the default predicted motion vector that is determined by a manner agreed upon with motion vector encoding apparatus 200 as the predicted motion vector for the current motion vector.

Second predicted motion vector determiner 340 operates if the current block is in the competing prediction mode to determine the predicted motion vector for the current motion vector with a selected motion vector from a set of candidate motion vectors that is selectable by a reconstructed motion vector prediction mode from prediction mode decoder 310, i.e. an optimal predicted motion vector or the default predicted motion vector that is determined by a manner agreed upon with motion vector encoding apparatus 200.

Here, second predicted motion vector determiner 340, in response to the motion vector prediction mode of the current block not being the non-competing prediction mode but the competing prediction mode, it should determine whether to use the optimal predicted motion vector (whether the motion vector prediction mode has a bit flag valued '1' for example) or whether to use the default predicted motion vector (whether the motion vector prediction mode has a bit flag valued '0' for example). To this end, second predicted motion vector determiner 340 performs sequential reading of bits of the motion vector prediction mode stored after being reconstructed by prediction mode decoder 310 each time the predicted motion vector of a block is determined and thereby determines the motion vector that is determined by the read motion vector prediction mode as the predicted motion vector of each block. At this time, because the bits of the motion vector prediction mode stored after being reconstructed by prediction mode decoder 310 is consisted of bits indicative of the motion vector prediction mode, second predicted motion vector determiner 340 in an effort to obtain the motion vector prediction mode for determining the predicted motion vector of each block sequentially reads the bits indicative of the motion vector prediction mode and takes the values of the bits read in determining which one to use between the optimal predicted motion vector and the default predicted motion vector. For example, if the read bit is valued '1', the optimal predicted motion vector is to be used and if the read bit is valued '0', the default predicted motion vector will be used.

If the decoder has the clear knowledge of which motion vector prediction mode was used from its arrangement with the encoder, there is no need to read the bit for representing the motion vector prediction mode, wherein the encoder may be saved from transmitting such motion vector prediction mode.

Motion vector reconstructor 350 adds the predicted motion vector (optimal predicted motion vector or default predicted motion vector) determined in first predicted motion vector determiner 330 or second predicted motion vector determiner 340 to the differential vector reconstructed in the differential vector decoder 320 to reconstruct the current motion vector of the current block.

The following is a detailed description on a motion vector encoding method through motion vector encoding apparatus 200 according to an aspect and referring to FIGS. 4 to 12.

Figure 4:
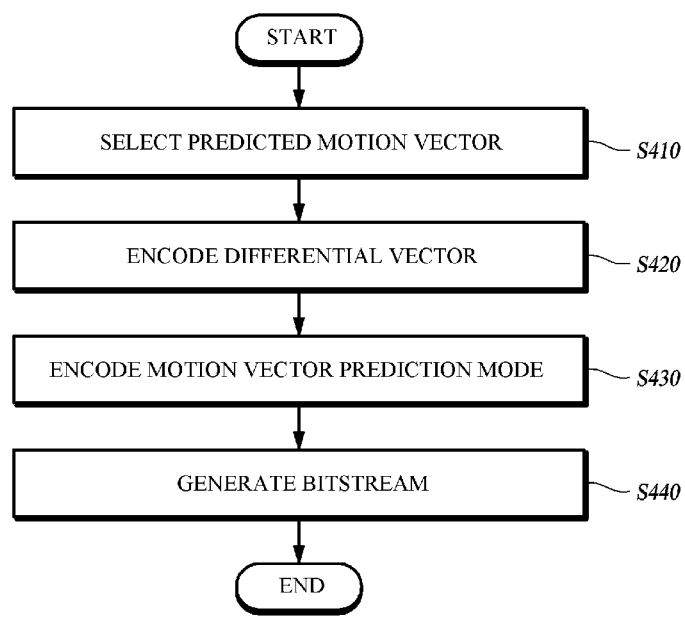
FIG. 4 is a schematic flow diagram showing a motion vector encoding method according to an aspect.

FIG. 4 is a schematic flow diagram showing a motion vector encoding method according to an aspect.

Motion vector encoding apparatus 200 selects a predicted motion vector of a current motion vector in a motion vector prediction mode selected from a number of motion vector prediction modes in step S410, encodes a differential vector between the current motion vector and the predicted and selected motion vector in step S420, encodes the motion vector prediction mode in the selected motion vector prediction mode in step S430, and generates and outputs a bitstream which includes the encoded differential vector and the encoded motion vector prediction mode in step S440.

In step S430 of encoding the motion vector prediction mode in the selected motion vector prediction mode by motion vector encoding apparatus 200 which is assumedly sharing the decision process of determining the motion vector prediction mode of the current block with motion vector decoding apparatus 300, motion vector encoding apparatus 200 may hold encoding the motion vector prediction mode if the motion vector prediction mode is non-competitive but proceed to the encoding the same only if it is the competing prediction mode. In other words, if the very motion vector prediction mode used is clearly known to the decoder from its arrangement with the encoder, encoding the motion vector prediction mode may not be necessary. For example, if the prearrangement is to use a motion vector at an upper, left side or other neighboring location as the motion vector prediction mode, encoding the motion vector prediction mode may be omitted.

For example, if there are no available candidate motion vectors for use as the predicted motion vector for the current motion vector (in this case, the absence of candidate motion vector for use as the predicted motion vector may permit all available candidate motion vectors to be defined as (0,0)) or there is just one available motion vector or there are candidate motion vectors in multitude but equivalence or there are different candidate motion vectors available for use and thus determined optimal predicted motion vector is identical to the default predicted motion vector, then it can be seen that motion vector encoding apparatus 200 and motion vector decoding apparatus 300 will find the same result regardless of which motion vector prediction mode was used in their selection of the optimal predicted motion vector. Therefore, motion vector encoding apparatus 200 and motion vector decoding apparatus 300 may select the same optimal predicted motion vector by sharing a predetermined decision process that any prediction modes used in selecting the optimal predicted motion vector lead to the same result.

As described, when motion vector encoding apparatus 200 and motion vector decoding apparatus 300 share the predetermined decision process and recognize the storage or transmission of the motion vector prediction mode, since the differential vectors can be recognized identical when they are generated and encoded using a predicted motion vector determined by the non-competing prediction mode, motion vector encoding apparatus 200 and motion vector decoding apparatus 300 determine the default predicted motion vector that is determined in their mutually agreed method as the predicted motion vector for the current motion vector.

In step S410, if the selected motion vector prediction mode is the non-competing prediction mode, motion vector encoding apparatus 200 determine the default predicted motion vector that is determined in the predetermined method as the predicted motion vector for the current motion vector.

Additionally in step S410, if the selected motion vector prediction mode is not the non-competing prediction mode, motion vector encoding apparatus 200 chooses between the optimal motion prediction vector and the default motion prediction vector for use as the predicted motion vector. To this end, motion vector encoding apparatus 200 selects one from a plurality of candidate motion vectors in a predetermined method for using the same as the predicted motion vector (i.e. the optimal predicted motion vector) of the current motion vector. In addition, the same process as described is used to determine if motion vector decoding apparatus 300 is capable of selecting its optimal predicted motion vector with a motion vector that is same as the optimal predicted motion vector determined by motion vector encoding apparatus 200, in other words, if the optimal predicted motion vector selected by motion vector encoding apparatus 200 is predictable by motion vector decoding apparatus 300.

If an optimal predicted motion vector for motion vector decoding apparatus 300 to select is same as the optimal predicted motion vector selected by motion vector encoding apparatus 200, the bit for identification of the motion vector prediction mode is determined to be a value (for example, '1') for representing a predictable mode, and the optimal predicted motion vector is determined to be the predicted motion vector for the current motion vector. However, if the optimal predicted motion vector for motion vector decoding apparatus 300 to select is not same as the optimal predicted motion vector selected by motion vector encoding apparatus 200, the bit for identification of the motion vector prediction mode is determined to be a value (for example, '0') for representing an unpredictable mode, and the default predicted motion vector is determined to be the predicted motion vector for the current motion vector.

Figure 5:
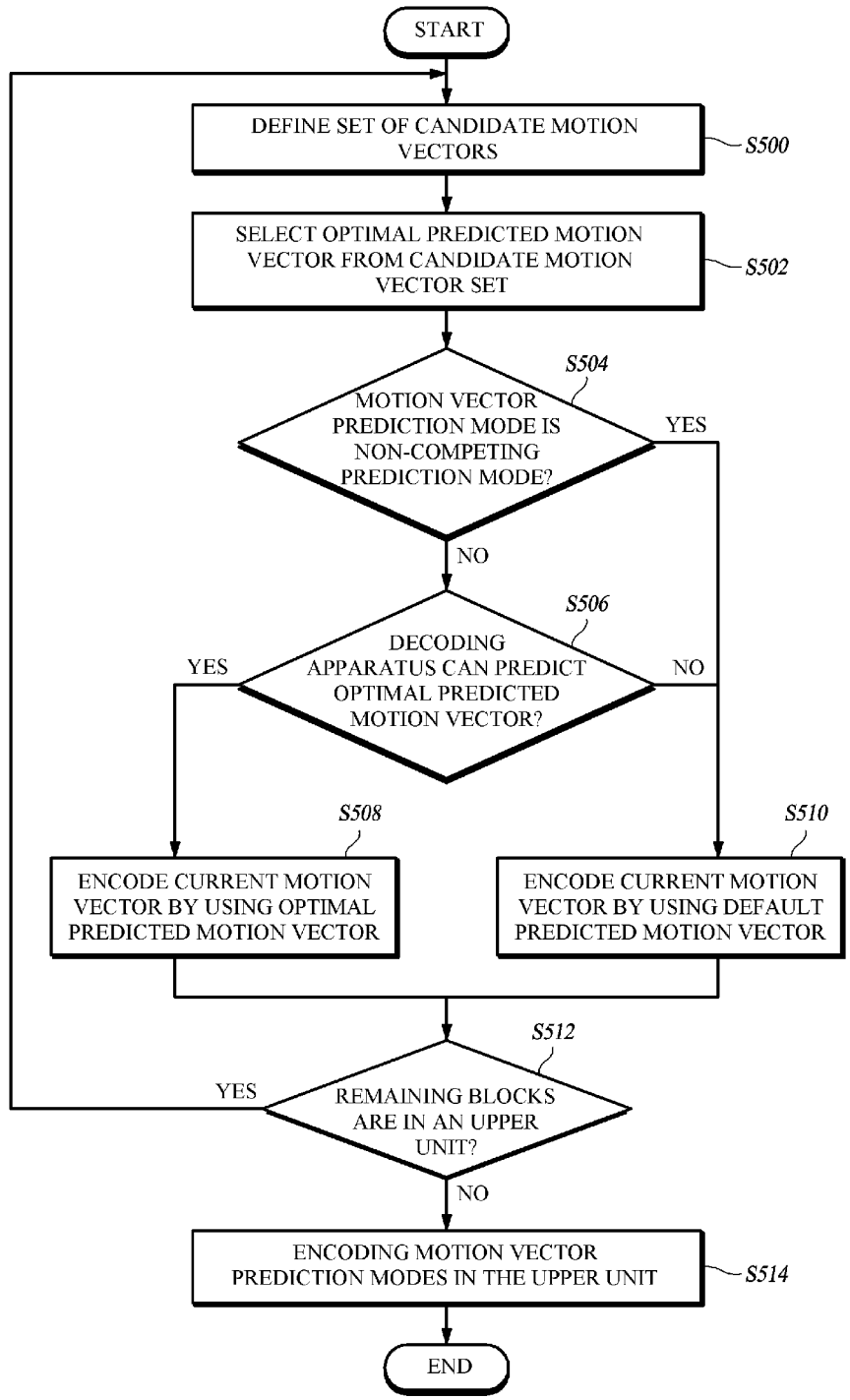
FIG. 5 is a flow diagram showing a specific implementation example of a motion vector encoding method according to an aspect.

The motion vector encoding method according to the aspect described with reference to FIG. 4 may be specified and implemented as illustrated in FIG. 5.

FIG. 5 is a flow diagram showing a specific implementation example of a motion vector encoding method according to an aspect.

Referring to FIG. 5, motion vector encoding apparatus 200 defines a set of candidate motion vectors for a current motion vector of the current block in step S500, selects the optimal predicted motion vector from the candidate motion vector set in step S502, determines if the motion vector prediction mode is the non-competing prediction mode in step S504, if so, determines if motion vector decoding apparatus 300 can predict the optimal predicted motion vector in step S506, and if so, encodes the current motion vector by using the optimal predicted motion vector in step S508, but if step S506 decide an inability of apparatus 300 to predict or step S504 decides that the motion vector prediction mode is not the non-competing mode or is the competing mode, the current motion vector is encoded with the default predicted motion vector in step S510.

If it is determined in step S540 that the motion vector prediction mode is the non-competing prediction mode and the non-competitive mode is evidently originated from the prearrangement with the decoder, then the step S506 may be saved from determining if motion vector decoding apparatus 300 can predict the optimal predicted motion vector. In this case, step S508 is in for encoding the current motion vector by using the optimal predicted motion vector. Therefore, this is the case where step S510 may be saved from encoding the current motion vector with the default predicted motion vector.

In addition, motion vector encoding apparatus 200 determines in step S512 if there are any such remaining blocks among the entire blocks in an upper unit of the blocks that have missed the steps from S500 to S510, and if so, proceeds to step S500 and carries out the steps from S500 to S510 on the remaining steps, and if there are no steps remaining, performs a third encoding in a step S514 with respect to motion vector prediction modes of the blocks in the upper unit.

Additionally, motion vector encoding apparatus 200 inserts the encoded current motion vector (i.e. differential vector) from steps S508 or S510 and the encoded motion vector prediction modes from step S514 to a bitstream and outputs such bitstream.

In step S504, motion vector encoding apparatus 200 determines if the motion vector prediction mode is the non-competing mode (and if the encoding is omissible accordingly) based on a predetermined decision criterion shared with motion vector decoding apparatus 300. Here, deciding whether the encoding of the motion vector prediction mode is omissible, i.e. whether the motion vector prediction mode is equivalent to the non-competing prediction mode is performed by determining if motion vector encoding apparatus 200 and motion vector decoding apparatus 300 share a predetermined decision process and thus need no exchanges of information between them to know which motion vector prediction mode should be used. In other words, corresponding to the non-competing prediction mode is the case where there is 0 or 1 available candidate motion vector or there are one or more but identical candidate motion vectors or there are two or more candidate motion vectors which are nonidentical but cause an optimal predicted motion vector to be selected and identical to a default predicted motion vector. Therefore, the option to omit the encoding of the motion vector prediction mode, that is, whether the motion vector prediction mode equals the non-competing prediction mode is determined on the condition that the differential vector generated and encoded by the default predicted motion vector and the differential vector generated and encoded by the default predicted motion vector can be seen equal to each other. The description concerned was provided with reference to FIG. 2 and another detailed explanation will be omitted. Or, the case, where which motion vector was used as the predicted motion vector is clearly known to the decoder from its arrangement with the encoder, corresponds to the non-competing prediction mode. For example, it may be prearranged with the encoder that, for a block identified as having a particular shape, certain neighboring motion vector is chosen to be used as the predicted motion vector based on its shape or position.

If step S504 determines the motion vector prediction mode to be the non-competing prediction mode or step S506 concludes an inability of motion vector decoding apparatus 300 to predict the optimal predicted motion vector selected in step S502, motion vector encoding apparatus 200 in step S514 does not encode the motion vector prediction mode. However, if step S506 determines the motion vector prediction mode to be the non-competing prediction mode and step S506 concludes an ability of motion vector decoding apparatus 300 to predict the optimal predicted motion vector selected in step S502, motion vector encoding apparatus 200 in step S514 does encode the block motion vector prediction mode.

In addition, motion vector encoding apparatus 200 in step S514 performs the encoding of the motion vector prediction mode by collectively encoding the motion vector prediction modes of the blocks allotted to the competing prediction mode among blocks in an upper unit than the units of a block. To this end, motion vector encoding apparatus 200 processes the motion vector prediction modes of the blocks that belong to the blocks in the upper unit and to the competing prediction mode by encoding the number (for example, the bit indicative thereof) of the motion vector prediction modes and that number of motion vector prediction modes (for example, the bits indicative thereof) using an uncompressed encoding or lossless compression encoding. At this time, in view of the collective encoding of the motion vector prediction modes of the blocks that are in the upper unit and allotted to the competing prediction mode by motion vector encoding apparatus 200, step S512 checks if there are any unprocessed blocks in the upper unit of the blocks and makes sure that the entire blocks in the upper unit of the blocks go through the steps from S500 to S512 to obtain the motion vector prediction modes of the entire upper unit bocks allotted to the competing prediction mode and let them encoded in step S514.

Eventually, the encoded differential vectors and the encoded motion vector prediction modes from step S512 are respectively inserted into the bitstream as syntax. The bitstream is transmitted by wire, wireless or other transmission channels including storage medium to motion vector decoding apparatus 300.

In the following, steps S500, S502, S506, S508, and S510 will be described in detail with reference to FIGS. 6, 7, 8, 9, and 12, respectively.

Figure 6:
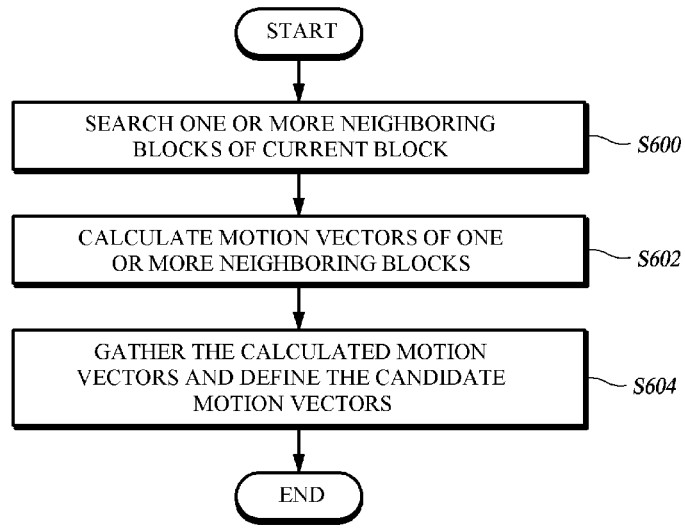
FIG. 6 is a flow diagram illustrating a step of defining a set of candidate motion vectors according to an aspect.

FIG. 6 is a flow diagram illustrating a step of defining a set of candidate motion vectors according to an aspect.

Referring to FIG. 6, step S500 for defining the set of candidate motion vectors according to an aspect includes a step S600 for searching one or more neighboring blocks of the current block, a step S602 for calculating respective motion vectors of the searched one or more neighboring blocks, and a step S604 for gathering the respective calculated candidate motion vectors and defining the candidate motion vector set.

Referring to the illustration of FIG. 1, the defined candidate motion vector set in step S500 becomes $\{MV^A, MV^B, MV^C\}$ comprised of the motion vectors contained in the neighboring blocks A, B, and C of the current block D at its left, upper, and right sides, respectively. However, more generally, the candidate motion vector set may be defined from gathering more diverse motion vectors.

For example, the motion vector of a block in previous existence on the temporal axis at the same location of the current block or the motion vector of a block at an upper left side on the spatial axis may be used as the candidate motion vector. Moreover, such motion vectors may be used to define other motion vectors (e.g. averaged value or median of several motion vectors) which are then included in the candidate motion vector set.

Hence, for the one or more neighboring blocks, step S600 may search one or more of at least one first block included in one or more of pictures in previous and future existence on the temporal axis at the same location of the current block and at least one second block on the spatial axis neighboring the current block.

In addition, for the respective motion vectors of the searched one or more neighboring blocks, step S602 may calculate one of respective motion vector of at least one first block, respective motion vector of at least one second block, and an averaged value or median of one or more respective motion vectors of the first block and the second block.

The candidate motion vector set described may be defined in many different methods under the prior knowledge of encoding apparatus 200 and decoding apparatus 300. In addition, if some or all of the component candidate motion vectors of the candidate motion vector set have a same value, the candidate motion vector set may be made to comprise candidate motion vectors of different values only.

Figure 7:
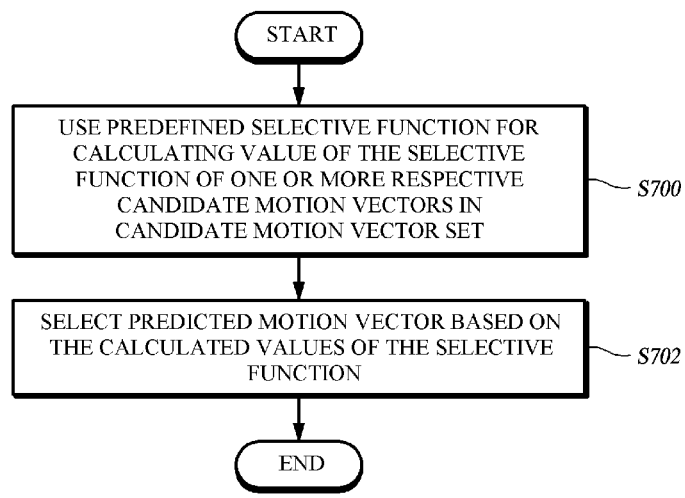
FIG. 7 is a flow diagram illustrating a step of selecting a predicted motion vector according to an aspect.

FIG. 7 is a flow diagram illustrating a step of selecting a predicted motion vector according to an aspect.

Referring to FIG. 7, step S502 of selecting the predicted motion vector includes a step S700 that uses a predefined selective function between encoding apparatus 200 and decoding apparatus 300 for calculating the value of the selective function of one or more respective candidate motion vectors and a step S702 for selecting a candidate motion vector as the optimal predicted motion vector based on the calculated values of the selective function.

For example, the "value of selective function" mentioned may include one or more of or one or more in combination of a bit quantity needed to encode a differential vector of one or more respective candidate motion vectors in the defined candidate motion vector set against the current motion vector, the quantity of the differential vector of one or more respective candidate motion vectors in the defined candidate motion vector set against the current motion vector, and a bit quantity needed to encode the motion vector prediction mode.

If the bit quantity of the differential vector is used for the selective function value, the described step S702 may calculate, for example, the bit quantity needed to encode a differential vector of one or more respective candidate motion vectors in the defined candidate motion vector set and select the candidate motion vector having the lowest calculated bit quantity as the optimal predicted motion vector.

Besides the method of using the bit quantity for the selective function value as a base for selecting the optimal predicted motion vector, step S502 may also achieve the same by using a rate-distortion optimization method which considers the required bit quantity of encoding from a possible selection of one or more candidate motion vectors in the defined candidate motion vector set along with incidental quality of the picture to be reconstructed.

Step S502 of selecting the predicted motion vector may use a Lagrangian cost function in Equation 4 as the selective function for selecting the optimal predicted motion vector.

$$J(n,k)=D(n,k)+\lambda \times [R_H(n,k)+R_M(n,k)]$$ Equation 4

Here, J is a Lagrangian cost, D is the error of a reconstructed image from the original image, and $\lambda$ is a Lagrange multiplier. $R_H$ is the required bit quantity for encoding the motion vector prediction mode, and $R_M$ is the required bit quantity for encoding the differential vector of the current motion vector. J, D, $R_H$, $R_M$ in Equation 4 are defined by n for representing the number of a picture where the current block is located and k for representing the number of a block. This means the picture unit and the block unit are selectable for application.

In addition, for the occasion where D, the error of the reconstructed image from the original image in the process of selecting the optimal predicted motion vector or to facilitate the calculation, Equation 4 for calculating the Lagrangian cost J may be simplified by removing D and $\lambda$.

In the process of calculating Lagrangian cost that is caused by the motion vector encoding method, $R_H$ is the required bit quantity for encoding the motion vector prediction mode, and $R_M$ is the required bit quantity for the differential vector against the encoded current motion vector and is variably calculated by the motion vector prediction mode. Specifically, if the motion vector prediction mode indicates the inability of decoding apparatus 300 to predict the optimal predicted motion vector, $R_M$ is the required bit quantity for encoding the differential vector of a predicted motion vector generated by a median calculation or such predefined default methods that is the default predicted motion vector against the current motion vector. In addition, if the motion vector prediction mode indicates the ability of decoding apparatus 300 to predict the optimal predicted motion vector, $R_M$ becomes the required bit quantity for encoding the differential vector of the selected optimal predicted motion vector against the current motion vector.

Besides using the Lagrangian cost function as in Equation 4 to select the optimal predicted motion vector, step S502 of selecting the predicted motion vector may achieve the same by using Equation 5 which includes a some more generalized formula of selective function. However, Equation 5 is expressed assuming the current motion vector of the current block to be encoded as the block D motion vector $MV^D$.

$$PMV_{enc} = \underset{PMVC \in CS}{\arg\min}\, h(PMVC | MV^D)$$ Equation 5

In Equation 5, $PMV_{enc}$ is the selected optimal predicted motion vector, and PMVC represents an element (motion vector) that belongs to the candidate motion vector set CS of the candidate motion vectors which are selectable to be a predicted motion vector for the current motion vector $MV^D$. "h( )" is a selective function for selecting a predicted motion vector which is optimal to encode the current motion vector $MV^D$ through a difference operation on the current motion vector $MV^D$ from its predicted motion vector.

An example of the selective function h( ) for use may be the bit quantity required to encode the current motion vector after a difference operation or the sum of the required bit quantity for encoding the current motion vector after the difference operation and the required bit quantity for encoding the motion vector prediction mode. Further, in order to simplify the calculation, the differential vector quantity or the difference between current motion vector and the predicted motion vector may be used instead of the actually required bit quantity. More generally, the selective function h( ) may be defined in many different methods under the prior knowledge of encoding apparatus 200 and decoding apparatus 300. Given such selective function h( ), a candidate motion vector PMVC that optimizes the selective function h( ) may be selected as the optimal predicted motion vector $PMV_{enc}$, from the candidate motion vector set CS including the candidate motion vectors which are candidates for the predicted motion vector.

Figure 8:
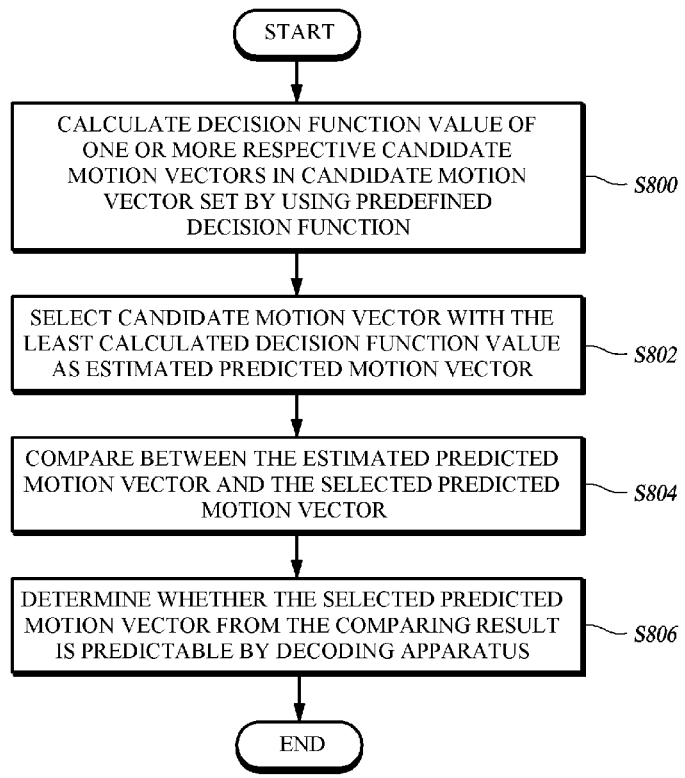
FIG. 8 is a flow diagram illustrating a process of determining the predictability of an optimal predicted motion vector according to an aspect.

FIG. 8 is a flow diagram illustrating a process of determining the predictability of an optimal predicted motion vector according to an aspect.

Referring to FIG. 8, the step S506 of determining the predictability of the optimal predicted motion vector includes a step S800 of calculating a decision function value of one or more respective candidate motion vectors included in a candidate motion vector set defined by a predefined decision function between encoding apparatus 200 and decoding apparatus 300, a step S802 of selecting one of at least one candidate motion vector as an estimated predicted motion vector of a current motion vector based on the calculated decision function, a step S804 of comparing between the estimated predicted motion vector that is selected and the optimal predicted motion vector that is selected, and a step S806 of determining whether the optimal predicted motion vector selected from the comparing result is predictable by decoding apparatus 300.

If the prearrangement of the encoder and the decoder clearly tells that decoding apparatus 300 can predict the selected optimal predicted motion vector, step S806 of determining may be omitted.

The step S506 of determining the predictability of the optimal predicted motion vector may also be described using the expression of Equation 5, a differential vector calculated using the optimal predicted motion vector $PMV_{enc}$ selected in the earlier step S502, a finite number of candidate motion vectors which can become candidates for the predicted motion vector, a reference picture for use in a motion compensation, and information on already reconstructed neighboring blocks may be employed to determine whether the optimal predicted motion vector selected in the earlier step S502 is predictable by motion vector decoding apparatus 300.

Alternatively, the step S506 of determining the predictability of the optimal predicted motion vector may also be described using the expression of Equation 5, a differential vector calculated using the optimal predicted motion vector $PMV_{enc}$ selected in the earlier step S502, a finite number of candidate motion vectors which can become candidates for the predicted motion vector, a reference picture for use in a motion compensation, information on already reconstructed neighboring blocks, and residual signals according to the motion compensation for pixel values may be employed to determine whether the optimal predicted motion vector selected in the earlier step S502 is predictable by motion vector decoding apparatus 300.

To this end, motion vector decoding apparatus 300 uses $DMV^D(=MV^D-PMV_{enc})$ which is the differential vector against the current motion vector ($MV^D$) to be calculated and transmitted by motion vector encoding apparatus 200, the information on the already reconstructed neighboring blocks, and the reference picture for use in the motion compensation in finding the estimated predicted motion vector $PMV_{dec}$ through a predetermined decision method such as Equation 6.

$$PMV_{dec} = \underset{PMVC \in CS}{\operatorname{argmin}} g(PMVC | DMV^D) \qquad \text{Equation 6}$$
$$= \underset{PMVC \in CS}{\operatorname{argmin}} g(PMVC | MV^D - PMV_{enc})$$

In Equation 6, decision function g( ) is for motion vector encoding apparatus 200 to determine whether motion vector decoding apparatus 300 can predict the optimal predicted motion vector $PMV_{enc}$ by using the differential vector to be calculated and transmitted by motion vector encoding apparatus 200 and the information on the already reconstructed neighboring blocks. The decision function g( ) is also used by motion vector decoding apparatus 300 in predicting the predicted motion vector. As described earlier, if the prearrangement of the encoder and the decoder clearly tells that decoding apparatus 300 can predict the selected optimal predicted motion vector, the decision function may not be used.

The decision function g( ) may be defined in different methods under the prior knowledge of motion vector encoding apparatus 200 and motion vector decoding apparatus 300, and an aspect of such decision function g( ) will be specified below.

Through Equation 6, motion vector encoding apparatus 200 performs an advance calculation of the estimated predicted motion vector $PMV_{dec}$ which will be figured out by motion vector decoding apparatus 300, and then examines whether motion vector decoding apparatus 300 can predict the optimal predicted motion vector $PMV_{enc}$ and obtain correctly reconstructed image data by using the provided differential vector $DMV^D(=MV^D-PMV_{enc})$ and the information on the already reconstructed neighboring blocks. In other words, motion vector encoding apparatus 200 performs in advance the future process of finding the optimal predicted motion vector by motion vector decoding apparatus 300 in order to employ the result in its encoding operation.

Several aspects of the described steps S804 and S806 will be described next. Firstly, an aspect of the method for determining if the optimal predicted motion vector $PMV_{enc}$ is predictable by motion vector decoding apparatus 300 is as follows.

If the estimated predicted motion vector $PMV_{dec}$ calculated through Equation 6 in step S506 equals to the optimal predicted motion vector $PMV_{enc}$ selected in step S502, motion vector decoding apparatus 300 may add its own estimated predicted motion vector $PMV_{dec}$ to the differential vector $DMV^D$ provided by motion vector encoding apparatus 200 and thereby reconstruct an accurate current motion vector $MV^D$, acquiring the correctly reconstructed image data. Therefore, motion vector encoding apparatus 200 is responsive to its own selection of the estimated predicted motion vector $PMV_{dec}$ being identical to the estimated predicted motion vector $PMV_{dec}$ that is estimated to be figured out by motion vector decoding apparatus 300 for determining predictability of the optimal predicted motion vector $PMV_{enc}$ by motion vector decoding apparatus 300 and otherwise determining unpredictability.

Alternatively, depending on aspects, motion vector encoding apparatus 200 is responsive to its own selection of the estimated predicted motion vector $PMV_{dec}$ being different from the estimated predicted motion vector $PMV_{dec}$ that is estimated to be figured out by motion vector decoding apparatus 300 by an amount less than a predetermined boundary value for determining predictability of the optimal predicted motion vector $PMV_{enc}$ by motion vector decoding apparatus 300 and otherwise determining unpredictability.

Another aspect of the method for determining if the optimal predicted motion vector $PMV_{enc}$ is predictable by motion vector decoding apparatus 300 is as follows. In an event that the compression rate of an image is high or changes of image pixels are not great or changes of motion vectors of an image are not great, even if the optimal predicted motion vector $PMV_{enc}$ and the estimated predicted motion vector $PMV_{dec}$ are not same, image data through a motion compensation by using a motion vector (i.e. $MV^D=DMV^D+PMV_{dec}$) reconstructed with the estimated predicted motion vector $PMV_{dec}$ is happen to be identical to image data through a motion compensation by using a motion vector (i.e. $MV^D=DMV^D+PMV_{enc}$) reconstructed with the optimal predicted motion vector $PMV_{enc}$ wherein the optimal predicted motion vector $PMV_{enc}$ is determined to be predictable by motion vector decoding apparatus 300 using the estimated predicted motion vector $PMV_{dec}$ and otherwise it is determined to be unpredictable regardless of the inequality between the optimal predicted motion vector $PMV_{enc}$ and the estimated predicted motion vector $PMV_{dec}$.

Yet another aspect of the method for determining if the optimal predicted motion vector $PMV_{enc}$ is predictable by motion vector decoding apparatus 300 is as follows. If the difference between the reconstructed image data that was obtained by using the estimated predicted motion vector $PMV_{dec}$ for enhancing the compression rate and a reconstructed image data to be obtained by using the optimal predicted motion vector $PMV_{enc}$ is equal to or less than a predetermined boundary value (such as when the sum of difference or SAD between the two reconstructed image data is equal to or less than the predetermined boundary value), it is determined that the optimal predicted motion vector $PMV_{enc}$ is predictable by motion vector decoding apparatus 300 using the estimated predicted motion vector $PMV_{dec}$ and otherwise the optimal predicted motion vector $PMV_{enc}$ is unpredictable by motion vector decoding apparatus 300 using the estimated predicted motion vector $PMV_{dec}$.

Alternatively in that case where which motion vector was used as the predicted motion vector is clearly known to the decoder from its arrangement with the encoder, it is determined that motion vector decoding apparatus 300 can predict the optimal predicted motion vector $PMV_{enc}$. For example, it will be prearranged with the encoder that, for a block identified as having a particular shape, certain neighboring motion vector is chosen to be used as the predicted motion vector based on its shape or position.

To put the above described several aspects of determining the predictability in other words, described steps S804 and 806 see if the estimated predicted motion vector that is selected and the optimal predicted motion vector that is selected are same or differ by a value equal to or less than the predetermined boundary value, and if so, the selected optimal predicted motion vector is determined to be predictable by motion vector decoding apparatus 300.

Or, in the case where which motion vector was used as the predicted motion vector is clearly known to the decoder from its arrangement with the encoder, it is determined that motion vector decoding apparatus 300 can predict the optimal predicted motion vector $PMV_{enc}$. For example, since it may be prearranged with the encoder that, for a block identified as having a particular shape, certain neighboring motion vector is chosen to be used as the predicted motion vector based on its shape or position, the selected optimal predicted motion vector may be determined to be predictable by motion vector decoding apparatus 300.

In addition, if described steps S804 and 806 see that the reconstructed image data using the estimated and selected predicted motion vector and the reconstructed image data using the selected optimal predicted motion vector are same or differ by a value equal to or less than the predetermined boundary value, the selected optimal predicted motion vector may be determined to be predictable by motion vector decoding apparatus 300.

Referring to FIG. 8, motion vector encoding apparatus 200 calculates a decision function value by using a decision function (g( ) in Equation 6) predefined between motion vector encoding apparatus 200 and motion vector decoding apparatus 300 in step S800, and based on the calculated decision function value, selects a candidate motion vector having the minimum function value as in Equation 6 to be the estimated predicted motion vector $PMV_{dec}$ in step S802. Subsequently, the estimated predicted motion vector $PMV_{dec}$ and the optimal predicted motion vector $PMV_{enc}$ are compared in step S804, and the predictability is eventually determined in step S806.

The decision function predefined between motion vector encoding apparatus 200 and motion vector decoding apparatus 300 may be realized in various forms.

For decision function g( ) of Equation 6, a function using template matching or TM, boundary match or BM may be used.

To describe the decision function using TM first, a template matching pixel index set or template matching set (TMS) may be defined as a set of indices for representing relative positions of selected pixels with reference to a given designated block position such as positions of M pixels closely surrounding the designated block at its left side, top left side, and upper side. Other methods are also available depending on the needs. Generally, the more pixels TMS indicates, the greater the computation volume becomes. The method of template matching is subsequent to defining all the candidate predicted motion vectors in a set (CS) which are available for selection as the predicted motion vector, and uses Equation 7, an aspect of Equation 6 to calculate differences between the TMS indicative pixels for the current block and the TMS indicative pixels for the reference block designated by each of the candidate motion vectors among the defined candidate motion vector set and thereby calculates a matching error due to each of the candidate motion vectors and then selects the candidate with the least matching error as the estimated predicted motion vector $PMV_{dec}$ stated earlier.

$$PMV_{dec} = \operatorname*{argmin}_{PMVC \in CS} g(PMVC|DMV)$$

$$g(PMVC|DMV) = \sum_{i \in TMS} [f(PMVC + DMV, i) - C(i)]^2$$

Equation 7

Equation 7 has f(PMVC+DMV, i) wherein (PMVC+DMV) represents pixel positions which are represented by indices i (included in TMS) and neighboring the reference block in the reference picture indicated by index i, and f(PMVC+DMV, i) represents the pixel values in those positions. In addition, C(i) means the pixel values of pixels neighboring the current block and indicated by the indices i.

An aspect of the decision function, g(PMVC|DMV) brings a differential vector $DMV^D$ provided by motion vector encoding apparatus 200 and a candidate motion vector PMVC that is an element of the candidate motion vector set CS and used as the predicted motion vector into PMVC+DMV for calculating the motion vector of the corresponding block and then provides a calculation of how correct is the reconstructed block which is obtained from motion-compensating the corresponding block with the calculated motion vector. To calculate the same, Equation 7 uses a sum of squared error, although different applications would suggest other available methods including a sum of absolute difference SAD. $PMV_{dec}$ means the candidate motion vector PMVC that minimizes an aspect of the decision function, g(PMVC|DMV).

In other words, step S800 in FIG. 8 calculates the pixel value differences between the pixels indicated by the template matching pixel indices for the current block and the pixels indicated by TMS (template matching set) for the reference block(s) designated by one or more respective candidate motion vectors among the defined candidate motion vector set, and based on the calculated pixel value differences, calculates the matching error of one or more respective candidate motion vectors for use as the decision function value as a way to execute the predefined decision function and calculate the decision function value.

Next, to describe a decision function using the boundary matching (BM), in a similar manner to the aspect of TMS, the boundary matching index set BMS may be defined as a set of indices for indicating the positions of the pixel values at the leftmost and the uppermost of the current block. Of course, BMS may be defined by the positions of some or all of the pixels within the current block at the block boundary depending on applications.

Subsequent to defining all the available candidate motion vectors in the set CS for selection as the predicted motion vector, in order to know which candidate motion vector PMVC is optimal among the candidate motion vector set CS, a boundary pixel matching is performed for computing how smooth connections are made at the boundary between the reconstruction of the current block through encoding with a motion compensation and its neighboring blocks to choose from the candidate motion vector set CS such a candidate motion vector PMVC that minimizes errors of the boundary pixel matching and set it as the estimated predicted motion vector $PMV_{dec}$.

To further detail this process, the pixel value of the current block is first reconstructed by adding the differential vector DMV calculated by motion vector encoding apparatus 200 to the value of the reference block designated by the candidate motion vector PMVC+DMV calculated with the element candidate motion vector PMVC of the candidate motion vector set CS and the differential vector DMV decided by motion vector encoding apparatus 200, and then among the current block reconstructions with motion compensation applied according to the respective motion vectors, a determination is made for such predicted motion vector that generates the reconstructed block having the highest boundary matching degree with the previously reconstructed neighboring pixels of the current block. For this purpose, the matching error belonging to the respective candidate motion vector is calculated with the sum of squared error as shown in Equation 8. Of course, SAD (sum of absolute difference) or other methods is available for the matching error calculation.

$$PMV_{dec} = \operatorname*{argmin}_{PMVC \in CS} g(PMVC|DMV)$$

$$g(PMVC|DMV) = \sum_{i \in BMS} [f(i) - C(i)]^2$$

Equation 8

In Equation 8, C(i) means the pixel values of the pixels, designated by the indices i within the boundary matching pixel index set BMS, among the reconstructed pixels of the current block reconstructed by adding a pixel residual signal after a motion compensation calculated by motion vector encoding apparatus 200 to the value of the reference block designated by the candidate motion vector PMVC+DMV calculated with the element candidate motion vector PMVC of the candidate motion vector set CS and the DMV decided by motion vector encoding apparatus 200. In addition, f(i) means the pixel values of the pixels which are among boundary pixels in the neighboring blocks of the current block and are immediate neighbors of pixels designated by the indices i in the BMS. Using Equation 8, the boundary pixel matching errors of the respective candidate motion vectors PMVC in the candidate motion vector set CS are calculated, and the candidate motion vector thereof with the least generated matching error is selected as the estimated predicted motion vector $PMV_{dec}$. This is called the predicted motion vector selected by motion vector decoding apparatus 300.

In other words, with regard to the one or more respective candidate motion vectors included in the defined candidate motion vector set, step S800 in FIG. 8 may use the pixel value differences between (A) the values of the pixels designated by the indices in the boundary matching pixel index set BMS and selected from the reconstructed pixels of the current block reconstructed from adding (1) the residual signal after the motion compensation calculated by motion vector encoding apparatus 200 to (2) the value of the reference block designated by the candidate motion vector calculated with (i) the differential vector decided by motion vector encoding apparatus 200 and (ii) the corresponding motion vector and (B) the values of the pixels positioned adjacent to the pixels designated by the indices in the boundary matching pixel index set BMS and selected from the boundary pixels in the neighboring blocks of the current block, as the basis for calculating the matching errors of the one or more respective candidate motion vectors to be the decision function values, whereby an execution of the predefined decision function calculates the decision function value.

To consummate step S506 with reference to FIG. 8, in steps S800 and S802, motion vector encoding apparatus 200 selects the estimated predicted motion vector $PMV_{dec}$ with the least matching errors determined by the set determination method of the template matching or the boundary pixel matching.

In step S804, an equality check is made by comparing the estimated predicted motion vector $PMV_{dec}$ that is selected and the optimal predicted motion vector $PMV_{enc}$ that is selected in step S502. In step S806, as in the described decision method, if the estimated predicted motion vector $PMV_{dec}$ and the optimal predicted motion vector $PMV_{enc}$ are equal, motion vector decoding apparatus 300 is decisively capable of predicting the optimal predicted motion vector for the current motion vector of the current block, and otherwise unpredictability is determined. In addition, as described above, notwithstanding an inequality found between the estimated predicted motion vector $PMV_{dec}$ and the optimal predicted motion vector $PMV_{enc}$, if they contributed reconstructing images which come to be identical or differ by less than a predetermined boundary value, the estimated predicted motion vector $PMV_{dec}$ and the optimal predicted motion vector $PMV_{enc}$ may be still estimated to be equal and motion vector decoding apparatus 300 be deemed capable of predicting the optimal predicted motion vector for the current motion vector of the current block.

Figure 9:
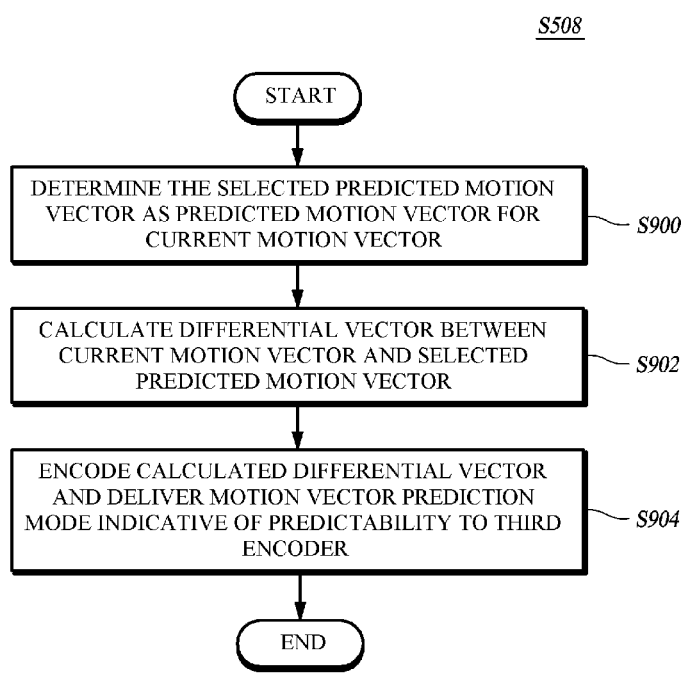
FIG. 9 is a flow diagram illustrating a step of encoding the current motion vector using the optimal predicted motion vector according to an aspect.

FIG. 9 is a flow diagram illustrating a step of encoding the current motion vector using the optimal predicted motion vector according to an aspect.

Referring to FIG. 9, step S508 of encoding the current motion vector by using the optimal predicted motion vector includes a step S900 for determining the selected optimal predicted motion vector as the predicted motion vector for the current motion vector; a step S902 for calculating a differential vector between the current motion vector and the selected optimal predicted motion vector; and a step S904 for encoding the current motion vector by encoding the calculated differential vector and delivering a motion vector prediction mode indicative of a predictability to third encoder 250.

Figure 10:
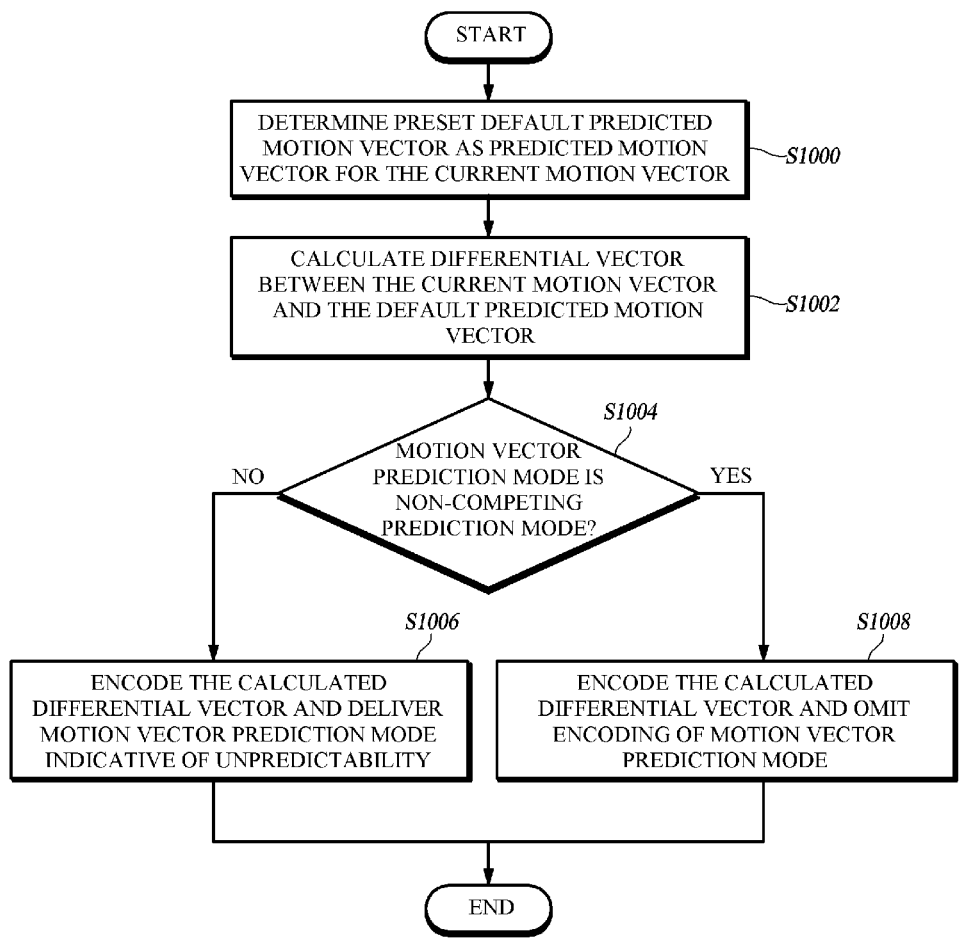
FIG. 10 is a flow diagram illustrating a step of encoding the current motion vector using a default predicted motion vector according to an aspect.

FIG. 10 is a flow diagram illustrating a step of encoding the current motion vector using a default predicted motion vector according to an aspect.

Referring to FIG. 10, step S510 of encoding the current motion vector by using the default predicted motion vector includes a step S1000 for determining a preset default predicted motion vector as the predicted motion vector for the current motion vector; a step S1002 for calculating a differential vector between the current motion vector and the preset default predicted motion vector; a step S1004 for determining whether the motion vector prediction mode by step S504 is the non-competing prediction mode; if the motion vector prediction mode is not the non-competing prediction mode or if the motion vector prediction mode is not omittable, a step S1006 responsive thereto for encoding the current motion vector by encoding the calculated differential vector and delivering a motion vector prediction mode indicative of an unpredictability to third encoder 250; and if the motion vector prediction mode is the non-competing prediction mode or if the motion vector prediction mode is omittable, a step S1008 responsive thereto for encoding the current motion vector by encoding the calculated differential vector and omitting an encoding of the motion vector prediction mode.

The preset default predicted motion vector in step S1002 is a median of motion vectors of one or more neighboring blocks of the current block and is preset between motion vector encoding apparatus 200 and motion vector decoding apparatus 300.

Or, in the case where which motion vector was used as the predicted motion vector is clearly known to the decoder from its arrangement with the encoder, the obvious predicted motion vector refers to the preset default predicted motion vector in step S1002. For example, the encoder and the decoder may agree in advance that, for a block identified as having a particular shape, certain neighboring motion vector is to use as the predicted motion vector based on its shape or position.

Figure 11:
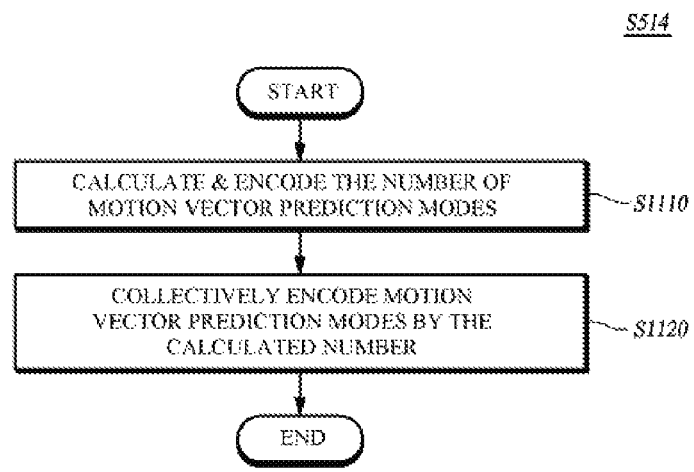
FIG. 11 is a flow diagram illustrating a step of performing a third encoding according to an aspect.

FIG. 11 is a flow diagram illustrating a step of performing a third encoding according to an aspect.

Referring to FIG. 11, the step S514 of encoding the motion vector prediction mode includes a step S1110 for calculating and encoding the number of motion vector prediction modes that are present in an independent encoding unit equivalent to an upper unit than a predetermined non-independent encoding unit containing the motion vector; and a step S1120 for collectively encoding motion vector prediction modes that are present in the independent encoding unit equivalent to the upper unit than the predetermined non-independent encoding unit containing the motion vector.

FIG. 12 is a flow diagram showing a specific implementation example of a motion vector decoding method according to an aspect.

Referring to FIG. 12, it can be seen that the number of the motion vector prediction modes that are present in an upper unit such as the independent encoding unit of the slice unit rather than its lower block unit in which the motion vector is encoded are collectively encoded along with the motion vector prediction modes.

In the following, the motion vector decoding method described according to the aspect of FIG. 3 using motion vector decoding apparatus 300 will be further detained with reference to FIGS. 13 to 15.

Figure 13:
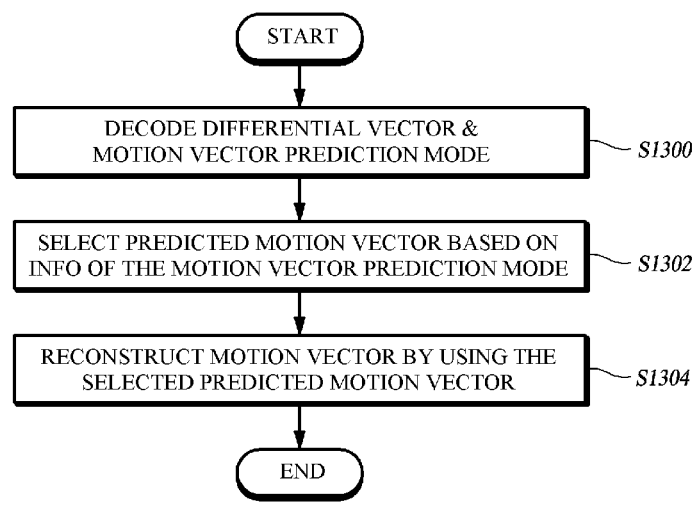
FIG. 13 is a flow diagram showing a motion vector decoding method according to an aspect.

FIG. 13 is a flow diagram showing a motion vector decoding method according to an aspect.

Referring to FIG. 13, motion vector decoding apparatus 300 decodes the bitstream to reconstruct the differential vector between the current motion vector and the predicted motion vector and the motion vector prediction mode of the current motion vector in step S1300, selects the predicted motion vector of the current motion vector based on the motion vector prediction mode in step S1302, and reconstructs the current motion vector by using the selected predicted motion vector in step S1304. At this time, if it is clearly known to the decoder whether to use predefined default predicted motion vector such as the value of the motion vector at an upper, left side or other neighboring location, step S1300 may be saved from reconstructing the motion vector prediction mode of the current motion vector.

In step S1300, motion vector encoding apparatus 200 decodes the selectively encoded motion vector prediction mode and differential vector in different independent or non-independent units which are predetermined and mutually agreed between motion vector encoding apparatus 200 and motion vector decoding apparatus 300. In other words, through a predetermined decision process promised in advance between motion vector encoding apparatus 200 and motion vector decoding apparatus 300, the presence or absence of the motion vector prediction mode is determined.

If the motion vector prediction mode is determined as being absent, the motion vector prediction mode is defined as a non-competing prediction mode, and step S1302 selects the predicted motion vector as the default predicted motion vector. If the motion vector prediction mode is determined as being present, from the motion vector prediction mode of the block allotted to the competing prediction mode in the upper unit reconstructed in step S1300, the method reads out a bit value for representing the motion vector prediction mode of the corresponding block, and selects the motion vector that this value indicates as the predicted motion vector of the corresponding block.

In step S1302, if the bit value for representing the motion vector prediction mode indicates that the same motion vector prediction mode is the competing prediction mode and the unpredictable mode at the same time (where the bit value is '0' for example), motion vector decoding apparatus 300 is responsive thereto and selects the default predicted motion vector determined by the previous agreement. Additionally in step S1302, if the bit value for representing the motion vector prediction mode indicates that the same motion vector prediction mode is the competing prediction mode and the predictable mode at the same time (where the bit value is '1' for example), motion vector decoding apparatus 300 is responsive thereto and selects one of a plurality of candidate motion vectors as the predicted motion vector for the current motion vector, that is the optimal predicted motion vector by using a predetermined method. Here, the predetermined method may be based on the template matching or the boundary pixel matching.

In the following, a specific example of the motion vector decoding method described according to the aspect of FIG. 13 will be further detained with reference to FIGS. 14 and 15.

Figure 14:
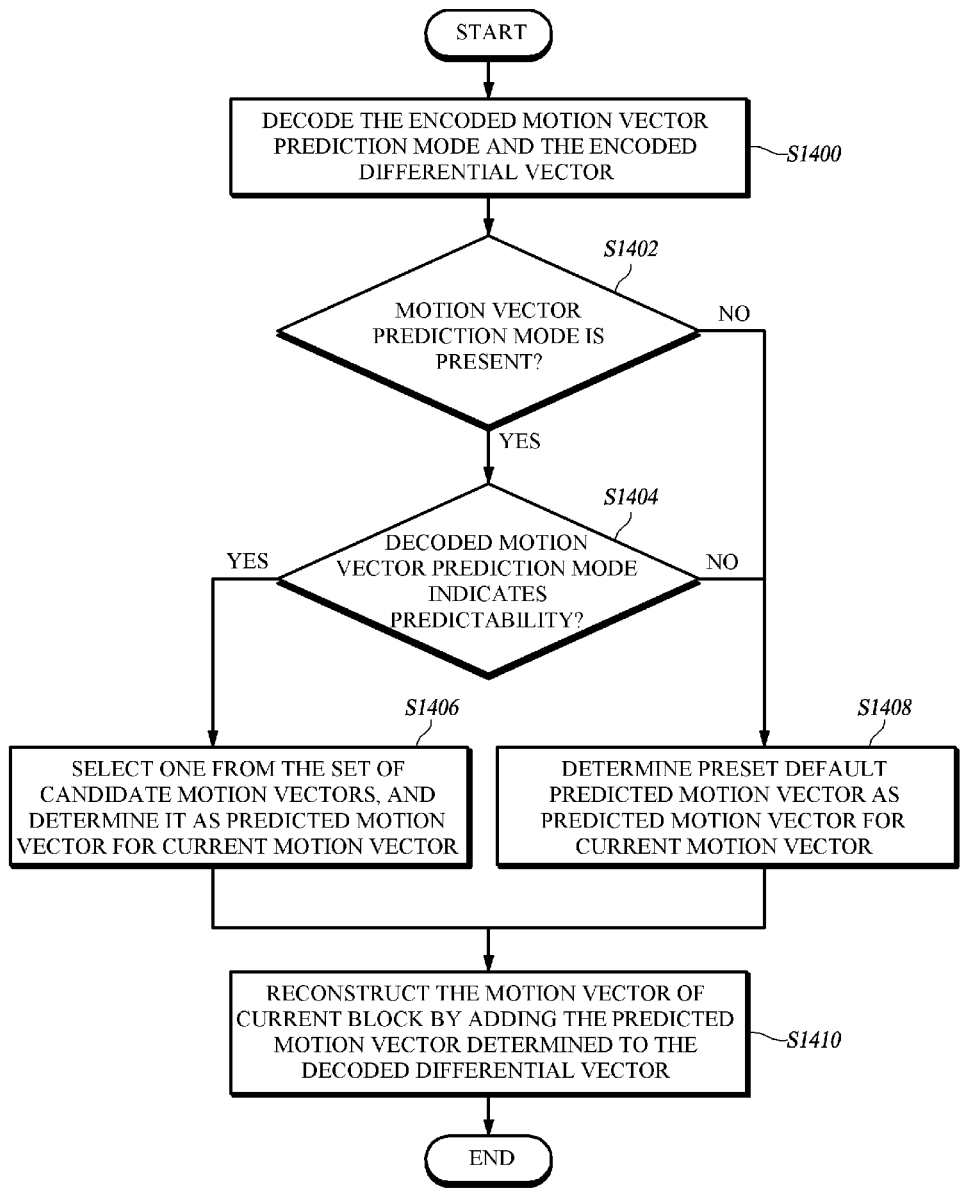
FIG. 14 is a flow diagram showing a specific implementation is example of a motion vector decoding method according to an aspect.

FIG. 14 is a flow diagram showing a particular exemplary motion vector decoding method according to an alternative aspect.

Referring to FIG. 14, the decoding method includes a step S1400 for motion vector decoding apparatus 300 to decode the encoded motion vector prediction mode and the encoded differential vector through motion vector encoding apparatus 200; a step S1402 for determining the presence or absence of the motion vector prediction mode; a step S1404 for determining whether the decoded motion vector prediction mode indicates predictability or unpredictability; a step S1406 responsive to the decoded motion vector prediction mode indicating predictability, for defining a set of candidate motion vectors available to be selected as the predicted motion vector for reconstructing the current motion vector of the current block, selecting an optimal predicted motion vector from the defined set of candidate motion vectors, and determining the selected optimal predicted motion vector as the predicted motion vector for the current motion vector; a step S1408 responsive to the motion vector prediction mode being absent or the decoded motion vector prediction mode indicating unpredictability, for determining a default predicted motion vector that is determined by a preset method as the predicted motion vector for the current motion vector; and a step S1410 for reconstructing the current motion vector of the current block by adding the predicted motion vector determined in step S1406 or S1408 to the decoded differential vector.

If the decoder clearly knows from its arrangement with the encoder of which motion vector prediction mode, it is not necessary to read the bit for representing step S1400 of reconstructing the motion vector prediction mode, step S1402 for determining the presence or absence of the motion vector prediction mode, and step S1404 for determining whether the decoded motion vector prediction mode indicates predictability or unpredictability, wherein the encoder is also saved from transmitting such motion vector prediction mode.

The encoded differential vector in step S1400 may be the differential vector between the current motion vector and the preset default predicted motion vector or the differential vector between the current motion vector and the optimal predicted motion vector.

Figure 15:
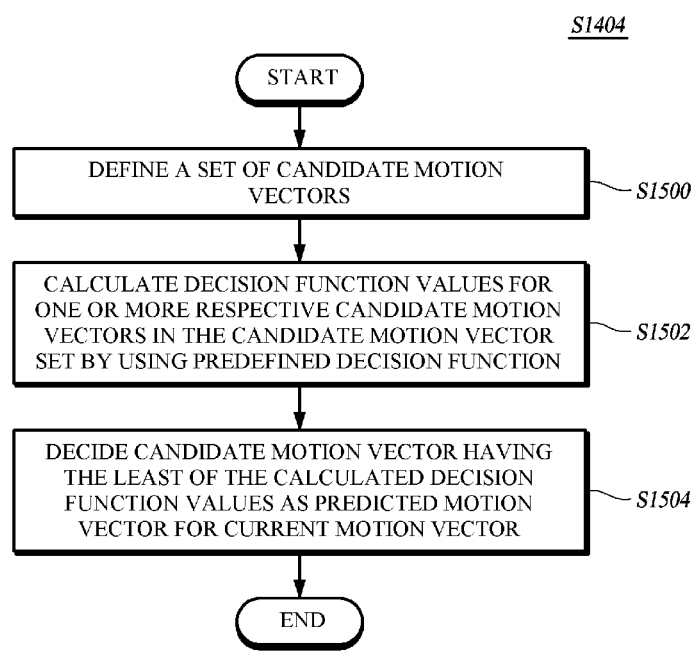
FIG. 15 is a flow diagram illustrating a step of determining the default predicted motion vector as a predicted motion vector for the current motion vector according to an aspect.

FIG. 15 is a flow diagram illustrating a step of determining the default predicted motion vector as the predicted motion vector for the current motion vector according to an aspect.

Referring to FIG. 15, step S1408 for determining the default predicted motion vector as the predicted motion vector for the current motion vector includes a step S1500 for defining a set of candidate motion vectors available to be selected as the predicted motion vector for reconstructing the current motion vector of the current block; a step S1502 for calculating decision function values for one or more respective candidate motion vectors includes in the set by using a decision function commonly defined by motion vector encoding apparatus 200 and motion vector decoding apparatus 300; and a step S1504 for selecting the candidate motion vector having the least of the calculated decision function values as the optimal predicted motion vector and deciding the selected optimal predicted motion vector as the predicted motion vector for the current motion vector.

In step S1504, the optimal predicted motion vector determined by motion vector decoding apparatus 300 as the predicted motion vector for the current motion vector may be equal to an estimated predicted motion vector $PMV_{dec}$ which motion vector encoding apparatus 200 estimated that motion vector decoding apparatus 300 would find, or the optimal predicted motion vector may differ from the estimated predicted motion vector $PMV_{dec}$ by a predetermine boundary value.

Additionally, in step S1502, motion vector decoding apparatus 300 calculates the pixel value differences between the pixels indicated by the template matching pixel indices for the current block and the pixels indicated by TMS (template matching set) for the reference block designated by one or more respective candidate motion vectors contained in the defined candidate motion vector set, and based on the calculated pixel value differences, calculates the matching error of one or more respective candidate motion vectors for use as the decision function value.

Further, in step S1502, with regard to the one or more respective candidate motion vectors included in the defined candidate motion vector set, motion vector decoding apparatus 300 uses the pixel value differences between the values of the pixels designated by the indices in the boundary matching pixel index set BMS and selected from the reconstructed pixels of the current block reconstructed from adding the residual signal after the motion compensation calculated by motion vector encoding apparatus 200 to the value of the reference block designated by the candidate motion vector calculated with the differential vector decided by motion vector encoding apparatus 200 and the corresponding motion vector and the values of the pixels positioned adjacent to the pixels designated by the indices in the boundary matching pixel index set BMS and selected from the boundary pixels in the neighboring blocks of the current block, as the basis for calculating the matching errors of the one or more respective candidate motion vectors to be the decision function values.

Figure 16:
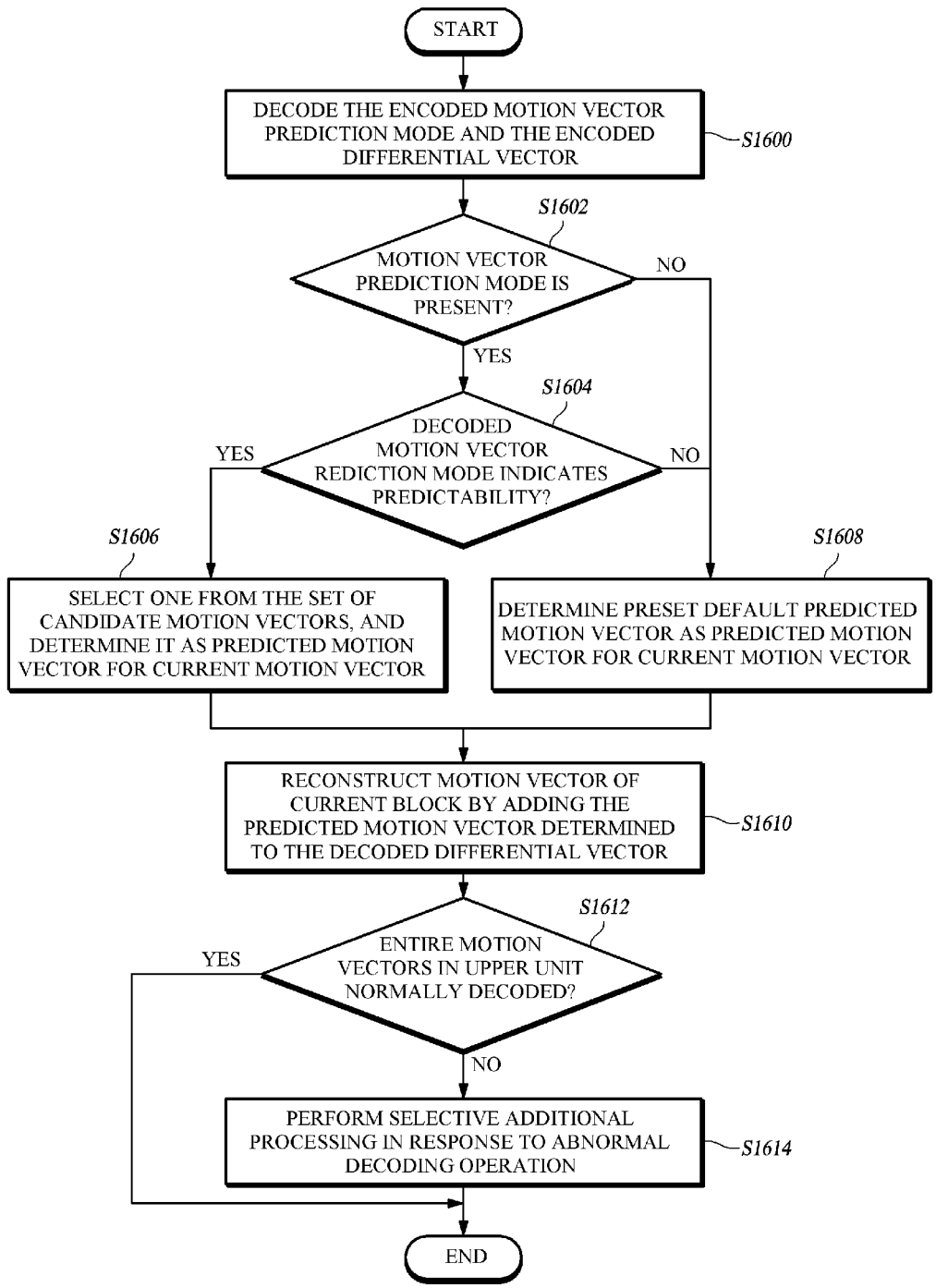
FIG. 16 is a flow diagram showing a motion vector decoding method according to an alternative aspect.

FIG. 16 is a flow diagram showing a motion vector decoding method according to an alternative aspect.

Referring to FIG. 16, the decoding method carried out by motion vector decoding apparatus 300 includes a step S1600 for decoding the encoded motion vector prediction mode and the encoded differential vector through motion vector encoding apparatus 200; a step S1602 for determining the presence or absence of the motion vector prediction mode; a step S1604 for determining whether the decoded motion vector prediction mode indicates predictability or unpredictability; a step S1606 responsive to the decoded motion vector prediction mode indicating predictability, for defining a set of candidate motion vectors available to be selected as the predicted motion vector for reconstructing the current motion vector of the current block, selecting an optimal predicted motion vector from the defined set of candidate motion vectors, and determining the selected optimal predicted motion vector as the predicted motion vector for the current motion vector; a step S1408 responsive to the motion vector prediction mode being absent or the decoded motion vector prediction mode indicating unpredictability, for determining a default predicted motion vector that is determined by a preset method as the predicted motion vector for the current motion vector; a step S1610 for reconstructing the current motion vector of the current block by adding the predicted motion vector determined in step S1606 or S1608 to the decoded differential vector; a step S1612 for determining a normal decoding operation by using the number of the motion vector prediction modes; and a step S1614 of a selective additional processing in response to an abnormal decoding operation.

In the aspect of the disclosure, under the premise that motion vector encoding apparatus 200 and motion vector decoding apparatus 300 have a predetermined decision process shared and agreed in advance between them, since they are autonomously and independently capable of determining whether the motion vector prediction mode of the block to be encoded or decoded is a non-competing prediction mode, simply the bit for differentiating the predictable mode from the unpredictable mode may be transmitted only when the block motion vector prediction mode is the competing prediction mode and the motion vector prediction mode is saved from being encoded when it is the non-competing prediction mode, whereby the bit quantity required for encoding the current motion vector can be substantially reduced.

At this time, for motion vector encoding apparatus 200 to be capable of determining whether the block motion vector prediction mode is the non-competing prediction mode, another premise must comply that the previously decoded neighboring block information is accurate. That is, if an error occurs in a reconstructed motion vector of the previously decoded neighboring block and causes reconstruction of a different motion vector than the one used in the encoding operation, at the time of determining whether the motion vector prediction mode of the block to be decoded is the non-competing prediction mode, an error may occur resulting in a decoder crash.

For example, in the case where the reconstructed motion vector of the previously decoded neighboring block is errorless maintaining the motion vector prediction mode of the block to be decoded is presumed the non-competing prediction mode, if an error occurred in the reconstructed motion vector of the previously decoded neighboring block and thus the motion vector prediction mode of the block to be decoded were mistakenly determined as being the competing prediction mode, motion vector decoding apparatus 300 reads the bit value of the reconstructed motion vector prediction mode by which it selects the predictable mode or the unpredictable mode and determines the optimal predicted motion vector or the default predicted motion vector as the predicted motion vector for the current block. However, since the motion vector prediction mode of the block was supposed to be the competing prediction mode unless the error entered in the reconstructed motion vector of the previously decoded neighboring block, the bit value of the reconstructed motion vector prediction mode was unnecessarily read, resulting in overspending of the bit value that is spared for the subsequent block which will encounter shortage of the bit value of the reconstructed motion vector prediction mode to read wherein the decoder crash will occur possibly halting the entire process of decoding a video.

Therefore, in order to solve such a problem, the present aspect in encoding the motion vector prediction mode by motion vector encoding apparatus 200 provides encoding of not only the bit indicative of the motion vector prediction mode (i.e. the bit representing the predictable mode and/or the bit representing the unpredictable mode) but also the bit indicative of the number of the motion vector prediction modes and inserts the same in the bitstream to the upper unit than the units of a block where the motion vector is determined, such as the slice unit or picture unit.

In addition, motion vector decoding apparatus 300 is made to do parsing of the encoded motion vector prediction modes that were inserted to the upper unit back from the bitstream to decode thereof independently of the process of the block unit decoding and the apparatus not only outputs the bit for representing the motion vector prediction modes but also compares between the acquired number of the motion vector prediction modes and the number of blocks that are decoded and have the motion vector prediction mode to see if the normal decoding is in process. For example, if the numbers are different and then concludes an occurrence of error for which the apparatus may take follow-up measures, as will be described below. In other words, motion vector decoding apparatus 300 may autonomously determine the occurrence of an error by using the number of the motion vector prediction mode, and upon judgment of the error occurred it can self-reset or attempt to normally reconstruct the motion vector through autonomously tracing the error.

To describe such operation of motion vector decoding apparatus 300 referring to FIG. 16, the step of determining a normal decoding operation by using the number of the motion vector prediction modes (S1612) may decide that a corresponding bitstream has not been decoded normally if there is a difference between the number of the motion vector prediction modes which is acquired from the step of decoding the encoded motion vector prediction mode and the encoded differential vector (S1600) and the number of the motion vector prediction modes which has been calculated through the step of determining the presence or absence of the motion vector prediction mode (S1602) until the complete decoding of the entire blocks in the upper unit such as a predetermined independent encoding unit of the slice. At the failure of normal reconstruction of the corresponding bitstream, the step of a selective additional processing in response to an abnormal decoding operation (S1614) may try various methods for the motion vector reconstruction.

For example, if the number of the motion vector prediction modes delivered by (or acquired via step S1600) motion vector encoding apparatus 200 is greater than the number of the motion vector prediction modes calculated upon the completion of the decoding process in the corresponding upper unit (such as the slice), it may be totally presumed that no motion vector prediction modes are present ignoring the remaining group of the motion vector prediction modes. To the contrary, if the number of the motion vector prediction modes is less than the number of the motion vector prediction modes calculated upon the completion of the decoding process in the corresponding upper unit meaning an occurrence of error in the stored (or transmitted) bitstream, the same bitstream may be ignored and the image may be reconstructed through an error concealment method instead.

The sequences of the steps in the flow charts of FIGS. 4 to 16 and the associated descriptions are mere examples for understanding the aspects of the present disclosure. Hence, the sequences may be modified depending on the manner of their implementations. In other words, the sequences of the steps in part or as a whole may be selectively changed, and in some cases partial or the entire steps might be carried out in parallel.

Figure 17:
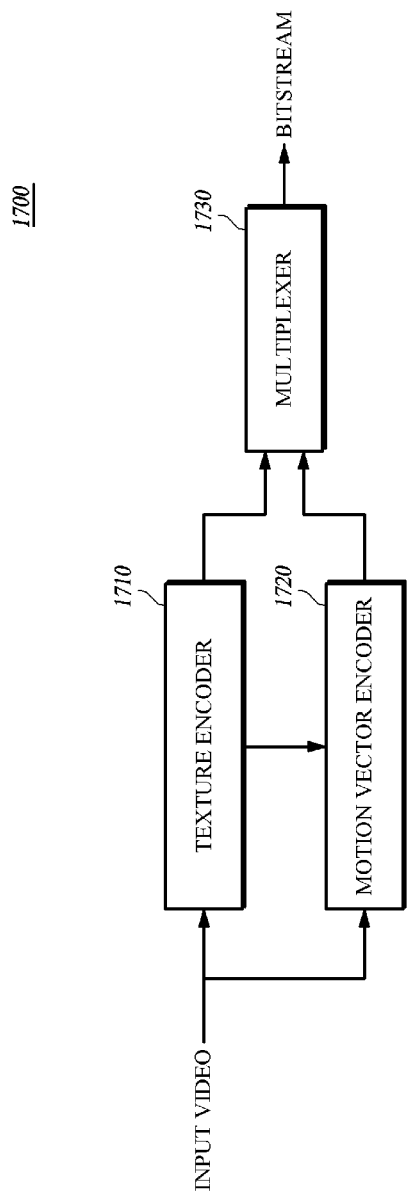
FIG. 17 is a schematic block diagram showing a video encoding apparatus according to an aspect.

FIG. 17 is a schematic block diagram showing a video encoding apparatus 1700 according to an aspect.

Video encoding apparatus 1700 may comprise a texture encoder 1710, a motion vector encoder 1720, and a multiplexer 1730.

Texture encoder 1710 predicts a current block to be encoded out of an input image following a current motion vector of the current block to encode the difference of the prediction from the current block that is a residual block and to output an encoded texture therefrom. Texture encoder 1710 will be detailed in a description referring to FIG. 18.

Motion vector encoder 1720 selects one of a number of motion vector prediction modes, selects the predicted motion vector of the current motion vector following the motion vector prediction mode selection, encodes the difference between the current motion vector and the predicted and selected motion vector that is a differential vector, and encodes the motion vector prediction mode following the motion vector prediction mode selection to output the encoded differential vector and the encoded motion vector prediction mode. Here, motion vector encoder 1720 performs the function same as or similar to that of motion vector encoding apparatus 200 described with reference to FIG. 2 and the detailed description is omitted.

Multiplexer 1730 generates and outputs the bitstream that contains the encoded texture, the encoded differential vector, and the encoded motion vector prediction mode. Here, in inserting the encoded and outputted motion vector prediction mode from motion vector encoder 1720 into the bitstream, multiplexer 1730 carries out the insertion not to the units of a block in the bitstream where the encoded texture and the encoded differential vector are inserted but its upper unit such as the slice unit or the picture unit, allowing the image decoding apparatus to decode the motion vector prediction mode independently.

Figure 18:
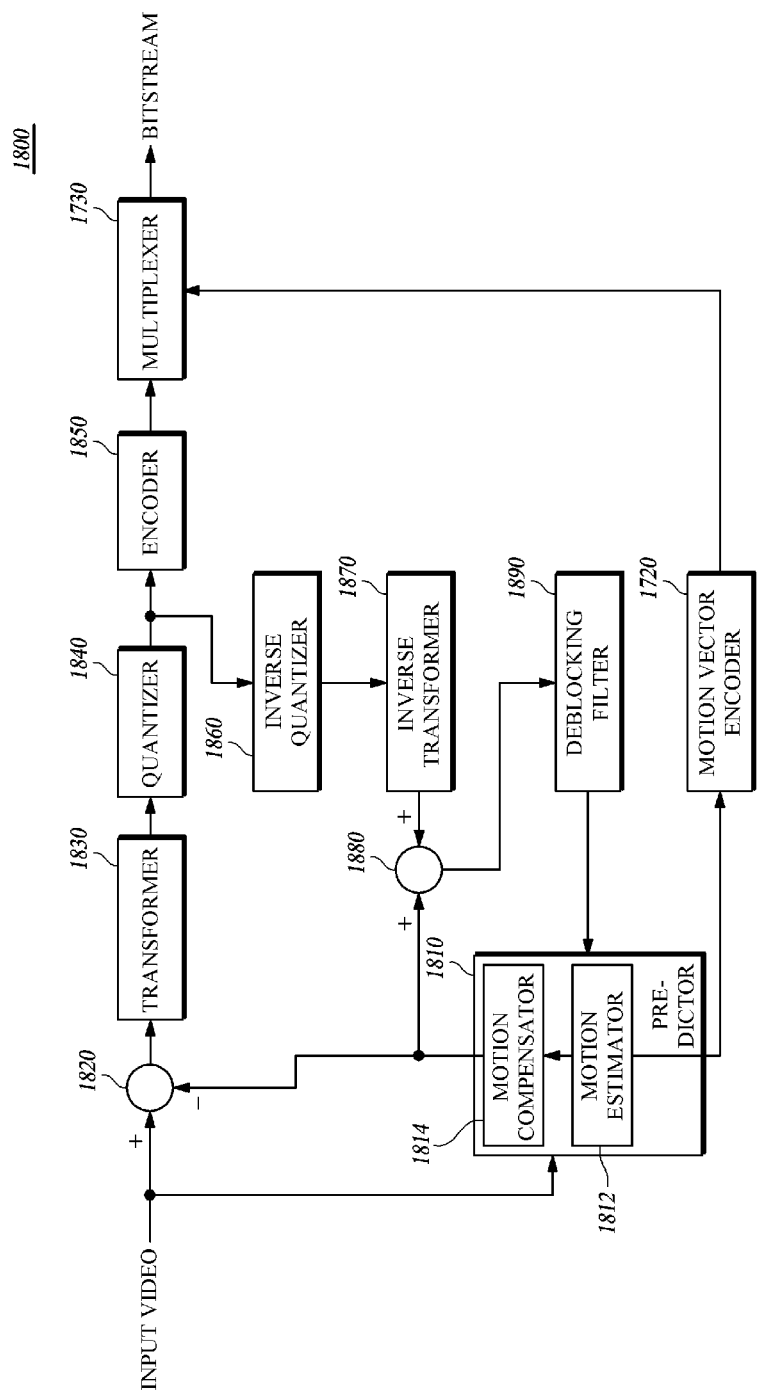
FIG. 18 is a detailed block diagram showing a video encoding apparatus according to an aspect.

FIG. 18 is a detailed block diagram showing a video encoding apparatus 1800 according to an aspect.

To illustrate the construction specifics of video encoding apparatus 1700 described with reference to FIG. 17, video encoding apparatus 1800 may be depicted as in FIG. 18.

Texture encoder 1710 may comprise a predictor 1810 including a motion estimator 1812 and a motion compensator 1814, a subtractor 1820, a transformer 1830, a quantizer 1840, an encoder 1850, an inverse quantizer 1860, an inverse transformer 1870, an adder 1880, and a deblocking filter 1890.

Predictor 1810 generates and outputs the predicted block of the current block. Specifically, predictor 1810 predicts the pixel value of each of pixels of the current block to be encoded to generate the predicted block having the predicted pixel values of the respective predicted pixels. Such predictor 1810 in performing an inter prediction may be like the illustration comprising motion estimator 1812 and motion compensator 1814.

Motion vector estimator 1812 determines the current motion vector by estimating the motion vector of the current block against one or more reference pictures in units of a block (for example, 16×16 block, 16×8 block, 8×16 block, 8×8 block, 8×4 block, 4×8 block, 4×4 block) corresponding to the block mode for the current block or the preset block mode. The current motion vector determined by motion vector estimator 1812 is outputted to motion vector encoder 1720 which then encodes the differential vector and the motion vector prediction mode.

Here, determining the current motion vector by motion vector estimator 1812 for predicting the current block motion vector with the reference picture is known to a person skilled in the art and the detailed description thereof is omitted.

Motion compensator 1814 generates and outputs the predicted block of the current block by using the current motion vector outputted from motion vector estimator 1812. That is, motion compensator 1814 outputs the block indicated by the current block in the reference picture, as the predicted block.

Subtractor 1820 generates the residual block by subtracting the predicted block from the current block. That is, subtractor 1820 generates the residual block having a residual signal in a block form by calculating the difference between the pixel value of each of the pixels of the current block and the predicted pixel value of each pixel of the predicted block from the predictor 1810.

Transformer 1830 and quantizer 1840 transforms and quantizes the residual block to output a quantized residual block. That is, transformer 1830 and quantizer 1840 transform the residual signal of the residual block into a frequency domain and hence transform each pixel value of the residual block into a transform coefficient, and then carry out a quantization of the residual block with the frequency coefficients.

Here, transformer 1830 may use various transform techniques for transforming image signals on a spatial axis to those on a frequency axis such as Hadamard transform, discrete cosine transform (DCT) based transform, etc in transforming the residual signal into the frequency domain wherein the residual signal having been transformed into the frequency domain becomes a transform coefficient. In addition, quantizer 1840 may perform the quantization on the transformed residual block through dead zone uniform threshold quantization (hereinafter called 'DZUTQ'), quantization weighted matrix, or their improved quantization techniques.

Encoder 1850 encodes the residual block outputted from quantizer 1840 to output an encoded texture. That is, encoder 1850 scans the quantized frequency coefficient, transform coefficient, or the residual signal in various scanning methods such as a zigzag scanning or others to generate a quantized transform coefficient sequence, transform coefficient sequence, or signal sequence and encode the same through the entropy coding technique or other various coding techniques.

The encoded texture outputted from encoder 1850 joins the encoded differential vector and the encoded motion vector prediction mode outputted from motion vector encoder 1720 which are generated as a bitstream and outputted.

Inverse quantizer 1860 and inverse transformer 1870 perform an inverse quantization and an inverse transform on the quantized residual block. Specifically, inverse quantizer 1860 and inverse transformer 1870 inversely quantizes the quantized frequency coefficients of the quantized residual block to generate a residual block with a transform coefficient, and inversely transform the inversely quantized residual block to generate a residual block with pixel values, i.e. reconstructed residual block. Here, inverse quantizer 1860 and inverse transformer 1870 may have the described transform method and the quantizing method inverted to perform their inverse transform and quantization operations.

Adder 1880 adds the reconstructed residual block from inverse transformer 1870 to the predicted block from predictor 1810 and thereby reconstruct the current block. Deblocking filter 1890 performs a deblocking filtering on the reconstructed current block and outputs the result. Here, deblocking filtering means an operation for attenuating block distortions generated in the block unit encoding of images, and it may selectively use methods of applying a deblocking filter to the boundaries of blocks and macroblocks, applying the deblocking filter only to the boundaries of the macroblocks, and applying no deblocking filters.

In FIG. 18, transformer 1830 and quantizer 1840 may be implemented by a first encoder and encoder 1850 may be implemented by a second encoder, wherein the first encoder is included in texture encoder 1710 not necessarily but selectively depending on the manner of implementation. In other words, the residual signal outputted from subtractor 1820 undergoes both the transform and quantization not necessarily but one of the transform and quantization, or even neither the transform nor the quantization. In this case, incorporation of inverse quantizer 1860 and inverse transformer 1870 may be also optional depending on the desired operations of the transform and/or quantization. In addition, deblocking filter 1890 is not necessarily included in texture encoder 1710 but may be optional depending on the manner of implementation.

The video encoded into bitstreams by video encoding apparatus 1800 as described may be transmitted in real time or non-real-time to a video decoding apparatus as follows where it is reconstructed and reproduced into the video via a wired/wireless communication network including the Internet, a short range wireless communication network, a wireless LAN network, WiBro (Wireless Broadband) also known as WiMax network, and mobile communication network or a communication interface such as cable, USB (universal serial bus), or various other means.

Figure 19:
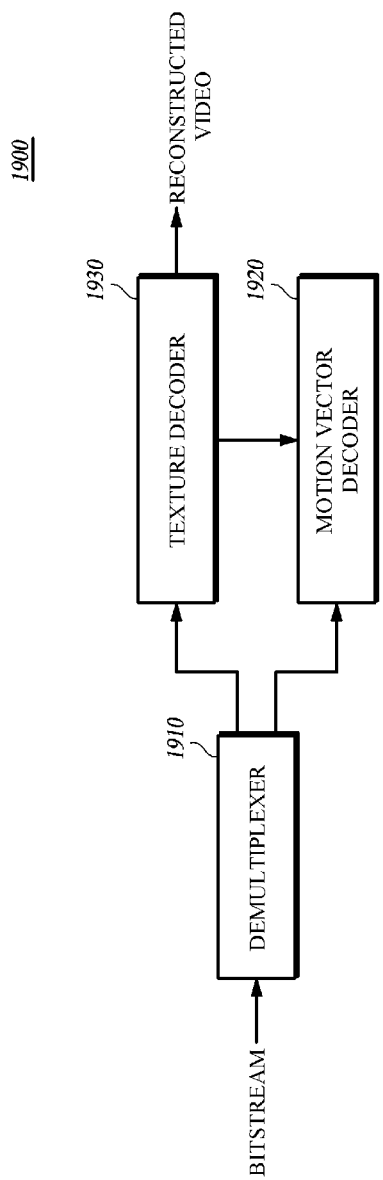
FIG. 19 is a schematic block diagram showing a video decoding apparatus according to an aspect.

FIG. 19 is a schematic block diagram showing a video decoding apparatus 1900 according to an aspect.

Video decoding apparatus 1900 may comprise a demultiplexer 1910, a motion vector decoder 1920, and a texture decoder 1930.

Demultiplexer 1910 extracts to output the encoded texture, the encoded differential vector, and the encoded motion vector prediction mode from the bitstream. Here, the encoded texture is outputted to texture decoder 1930, and the encoded differential vector and the encoded motion vector prediction mode are outputted to motion vector decoder 1920. At this time, demultiplexer 1910 may perform the extraction from parsing the encoded motion vector prediction mode that was encoded in the upper unit than the units of a block, such as the slice unit or picture unit.

Motion vector decoder 1920 decodes the encoded differential vector and the encoded motion vector prediction mode to reconstruct the differential vector and the motion vector prediction mode, selects the predicted motion vector for the current motion vector of the current block based on the reconstructed motion vector prediction mode, and adds the predicted and selected motion vector to the reconstructed differential vector to reconstruct the current block. Since motion vector decoder 1920 performs the function same as or similar to that of motion vector decoding apparatus 300 described with reference to FIG. 3, the detailed description is omitted.

Texture decoder 1930 decodes the encoded texture to reconstruct the residual block, and adds the reconstructed residual block to the predicted block generated by predicting the current block using the reconstructed current motion vector from motion vector decoder 1920. A specific example of implementing texture decoder 1930 will be described with reference to FIG. 20.

Figure 20:
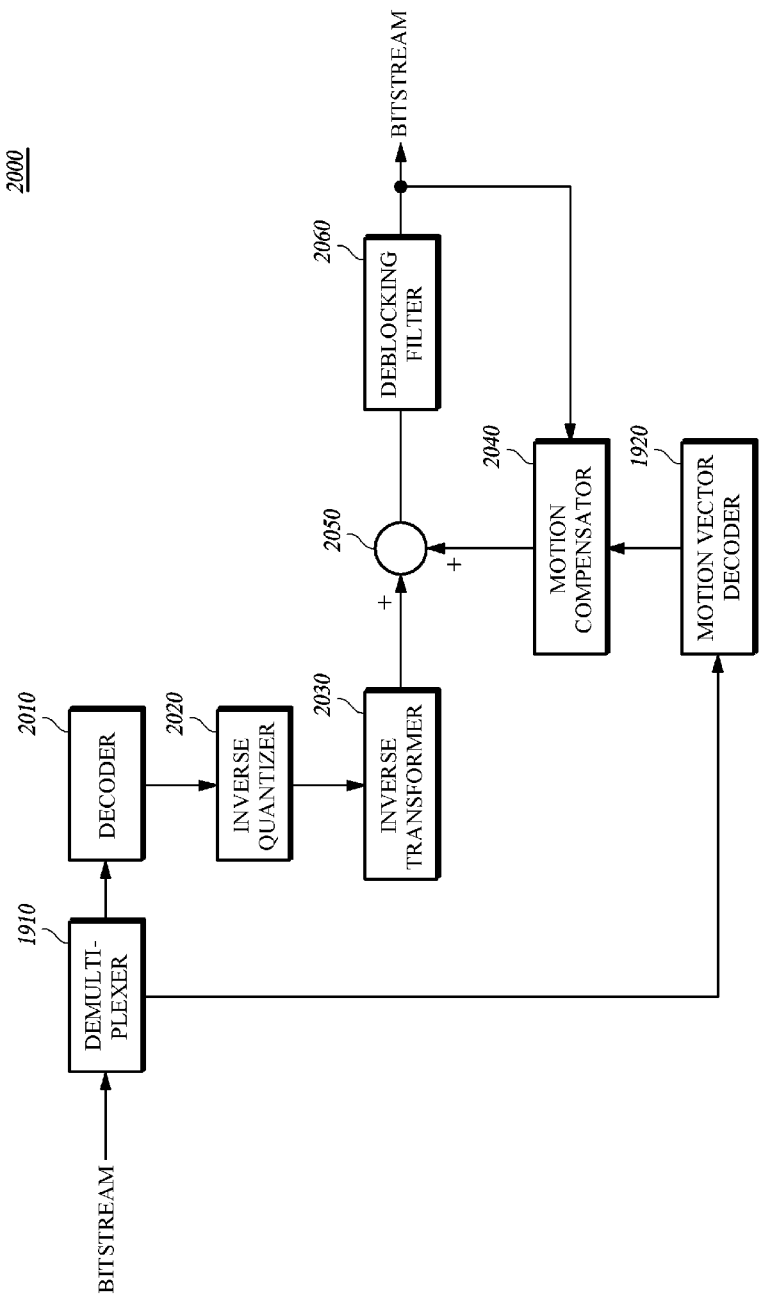
FIG. 20 is a detailed block diagram showing a video decoding apparatus according to an aspect.

FIG. 20 is a detailed block diagram showing a video decoding apparatus 2000 according to an aspect.

To illustrate the construction specifics of texture decoder 1930 incorporated into video decoding apparatus 1900 described with reference to FIG. 19, video decoding apparatus 2000 may be depicted as in FIG. 20.

Texture encoder 1930 may comprise a decoder 2010, an inverse quantizer 2020, an inverse transformer 2030, a motion compensator 2040, an adder 2050, and a deblocking filter 2060.

Decoder 2010 decodes the encoded texture outputted from demultiplexer 1910 to reconstruct a quantized residual block. Inverse quantizer 2020 and inverse transformer 2030 perform the functions same as or similar to those of inverse quantizer 1860 and inverse transformer 1870 described with reference to FIG. 18 and the detailed descriptions are omitted. However, in the case where video encoding apparatus 1800 either performs one of the transform or quantization on the residual block or none of them, inverse quantizer 1860 and inverse transformer 1870 may follow suit to provide the corresponding operation or none.

Motion compensator 2040 predicts the current block using the reconstructed current motion vector from motion vector decoder 1920 to output the predicted block. In other words, motion compensator 2040 generates the block which the reconstructed current motion vector indicates in one or more reference pictures, the predicted block to be outputted.

Adder 2050 adds the predicted block outputted from motion compensator 2040 to the reconstructed residual block from inverse transformer 2030 to reconstruct and output the current block.

According to the described aspect, the motion vector prediction mode includes the competing prediction mode and the non-competing prediction mode. Described as an example of the competing prediction mode are the motion vector prediction mode for representing unpredictability of the optimal predicted motion vector and the motion vector prediction mode for representing predictability of the optimal predicted motion vector. Here, the optimal predicted motion vector means the predicted motion vector selected from a finite number of candidate motion vector sets following a preset criterion or method, though the value of the predicted motion vector selected does not always meant to be optimal.

In addition, the competing prediction mode may be understood as being such mode that has been selected from other predicted motion vectors than the default predicted motion vector following a predetermined method and is available for use in encoding and/or decoding the current vector. In this case, the predicted motion vector may be selected from the described plurality of candidate motion vector sets in a predetermined method.

The disclosed aspects of the present disclosure allows the motion vector prediction mode to be selected and accordingly the motion vector with a higher approximation to the current motion vector prediction mode can be selected as the predicted motion vector to minimize the bit quantity for encoding the differential vector resulting in the encoding efficiency.

In addition, according to the aspects of the present disclosure, besides selecting the more accurate predicted motion vector towards the encoding efficiency improvement, motion vector encoding apparatus 200 does not bother to send the notice on the predicted motion vector selected to motion vector decoding apparatus 300 and instead, transmits leading information, e.g. the motion vector prediction mode or shares a function for finding thereof, whereby relieving the increase of the encoding bit quantity for additional information which would be incurred in notifying the predicted motion vector and thus improving the encoding efficiency and decoding efficiency additionally.

In addition, according to the aspects of the present disclosure, even if a transmission error or others infected the motion vector of the previously reconstructed neighboring block, motion vector decoding apparatus 300 is capable of identifying an occurrence of the error independently and taking follow-up measures of error concealment or error solution to prevent a decoder crash from happening and eventually enhancing the performance of the decoder.

In addition, to apply the aspects of the present disclosure in the motion vector and decoding techniques to video services or multimedia streaming services, the ability of encoding with a reduced bit quantity will provide highly satisfactory services to users. In particular, the wireless mobile environment that may experience a relatively narrow bandwidth, large data loss, and delay will find an even greater benefit in effect.

The following is to describe the findings in the course of arriving at the aspects of the present disclosure.

The aspects of the present disclosure are a further advancement over the MVOP method. The presently improved MVOP method may support the SKIP mode, and is capable of an independent parsing. Under the VCEG common test condition for a baseline profile, this improved MVOP method shows the BDBR performance improvement by an averaged 4.46% (1.66% for QCIF, 3.60% for CIF, and 6.84% for HD sequence) as compared to KTA 2.0 software.

Conventional MVOP methods use the entire available candidate PMV for the current block to compose a candidate set for the purpose of selecting a more precise predicted motion vector or PMV. The candidate set is composed of a combination of horizontal and vertical components of the motion vectors of temporally/spatially neighboring blocks. The encoder uses the rate-distortion optimization method to select an optimal PMV from the candidate set. The decoder uses the template matching method to select the optimal PMV autonomously. In order to select the optimal PMV with the least template matching error, all the available candidate sets are tested. Finally, the transmitted differential motion vector or DMV is now added with the PMV to be calculated into a motion vector.

In the presently advanced MVOP method, a single bit of additional information (mvop_flag) is used to signal whether the decoder needs to use the predicted optimal PMV or not. The prior MVOP methods have not supported the SKIP mode. For example, even if a suggested method had the DMV of 0 and satisfied all other SKIP conditions, a corresponding macroblock was encoded not in the SKIP mode but in P16×16 mode. This advanced MVOP method allows an expansion of the known MVOP method to use the SKIP mode more effectively.

In the conventional MVOP methods, the decoder cannot predict what PMV was used without an ambiguity wherein a flag is required to tell which prediction value must be used and one bit of additional information (mvop_flag) is necessary. For this reason, prior MVOP methods considered three different motion vector encoding modes (exception mode, replacement mode, competing mode), but the advanced MVOP method has simplified such motion vector encoding mode as follows:

Non-Competing Prediction Mode

Non-competing prediction mode represents that the optimal PMV selection gives no significant difficulty. This entails the following two cases. The first case is where there exists only one candidate PMV for the PMV selection. In this case, which prediction value to use is obvious to both the encoder/decoder. This case occurs when the neighboring motion vectors are totally same or none of them are effective. The encoder (and decoder) will be consistently using the one and only available PMV. The second case is where the predictable optimal PMV equals to a median PMV (That is, the predicted optimal PMV is same as the median PMV). Therefore, in this mode, the encoder (and decoder) uses the available PMV and the median PMV. So, since the decoder can recognize these two cases without additional information from the encoder, it does not use a flag separately.

Competing Prediction Mode

If a block is not the non-competing prediction mode described, the decoder can recognize it is the competing mode. In this mode, the decoder should be instructed on whether to use the predicted optimal PMV. For this purpose, one bit of flag mvop_flag is used. If the flag of mvop_flag is 1, the DMV is decoded by using the optimal PMV predicted through the template matching, and if the flag is 0, the decoder uses the median PMV to decode the DMV.

Independent Parsing

To reduce the bit quantity of the addition information, the mvop_flag is transmitted exclusive to the competing mode. Previously suggested MVOP methods by the present inventors needed to use reconstructed neighboring image data in determining whether to read the mvop_flag. Therefore, it could not satisfy the independent parsing condition. Besides, if a transmission error happens in the reference image, it is probable to read an unintended flag bit by error, causing the decoder crash problem.

The newly offered method is a syntax partitioning which eliminates a potential decoder crash problem by completely separating the parsing process from the decoding process. As shown in Table 1, encoding num_mvop_flag_minus1 for representing the number of the entire mvop_flag included in the slice and that number of mvop_flag in the slice into slice header information succeeded in completely separating the parsing process from the decoding process.

The parsing process reads and then stores the mvop_flag in the slice. In addition, the decoding process reads in the mvop_flag selectively depending on the decision of whether the competing mode is in or not. Therefore, there are no other syntax changes. In this way, the offered MVOP method can satisfy the independent parsing condition and thereby avoid the decoder crash problem. In addition, the offered method has an additional benefit of detectability of the probability of the bitstream having a transmission error. For example, if the number of the entire competing modes, which is always recognizable upon completing the encoding of the slice, is not equal to num_mvop_flag_minus1+1, an error means to be present. Responsively, a different decoding method may be designed and used to minimize the same error.

TABLE 1

| slice_header ( ) { | C | Descriptor |
|---|---|---|
| ... | | |
| num_mvop_flag_minus1 | 2 | u(v) |
| for( i=0; i<=num_mvop_flag_minus1; i++ ) { | | |
| mvop_flag[i] | 2 | u(1) |
| } | | |
| ... | | |
| } | | |

Evaluation Test

The advanced MVOP method was implemented by modifying the KTA 2.0 software. The test was conducted under the common test condition for the baseline profile, and the performance was measured in terms of BDBR and BDPSNR. For the sake of more pragmatic comparison, the performance of a MVC (motion vector competition) method was also presented. The MVC method uses two PMV candidates (spatial and temporal MV), which shows the best case of the MVC performance. All of the comparisons were anchored in the result of the KTA 2.0 software.

Evaluation Test using $CS_{SPTP}$

TABLE 2

| | Number of | | MVC in KTA 2.0 | | Improved MVOP | |
|---|---|---|---|---|---|---|
| Size | FrameSkip | Sequence | BDPSNR[dB] | BDBR[%] | BDPSNR[dB] | BDBR[%] |
| QCIF | 1 | Container | −0.009 | 0.067 | 0.040 | −0.846 |
| (176 × 144) | 1 | Foreman | 0.093 | −1.695 | 0.215 | −3.848 |
| | 1 | Silent Voice | −0.011 | 0.198 | 0.015 | −0.282 |
| CIF | 1 | Paris | 0.043 | −0.741 | 0.100 | −1.792 |
| (352 × 288) | 0 | Foreman | 0.155 | −3.786 | 0.253 | −6.100 |
| | 0 | Mobile | 0.161 | −3.073 | 0.180 | −3.449 |
| | 0 | Tempete | 0.115 | −2.391 | 0.145 | −3.057 |
| 720p60 | 0 | BigShips | 0.130 | −3.653 | 0.296 | −8.228 |
| (1280 × 720) | 0 | City | 0.041 | −1.152 | 0.069 | −1.872 |
| | 0 | Crew | 0.002 | −4.022 | 0.210 | −7.595 |
| | 0 | Night | 0.149 | −5.519 | 0.227 | −8.128 |
| | 0 | ShuttleStart | 0.204 | −6.126 | 0.268 | −8.365 |
| Average of QCIF | | | 0.024 | −0.477 | 0.090 | −1.658 |
| Average of CIF | | | 0.118 | −2.498 | 0.170 | −3.600 |
| Average of 720p60 | | | 0.127 | −4.094 | 0.214 | −6.838 |
| Average of overall | | | 0.089 | −2.658 | 0.168 | −4.464 |

TABLE 3

| | Number of | | Improved MVOP vs. KTA 2.0 with MVC | |
|---|---|---|---|---|
| Size | FrameSkip | Sequence | BDPSNR[dB] | BDBR[%] |
| QCIF | 1 | Container | 0.049 | −0.915 |
| (176 × 144) | 1 | Foreman | 0.121 | −2.190 |
| | 1 | Silent Voice | 0.026 | −0.476 |
| CIF | 1 | Paris | 0.057 | −1.059 |
| (352 × 288) | 0 | Foreman | 0.100 | −2.406 |
| | 0 | Mobile | 0.019 | −0.350 |
| | 0 | Tempete | 0.031 | −0.674 |
| 720p60 | 0 | BigShips | 0.167 | −4.808 |
| (1280 × 720) | 0 | City | 0.039 | −1.054 |
| | 0 | Crew | 0.102 | −3.748 |
| | 0 | Night | 0.076 | −2.745 |
| | 0 | ShuttleStart | 0.069 | −2.365 |
| Average of QCIF | | | 0.065 | −1.194 |
| Average of CIF | | | 0.052 | −1.122 |
| Average of 720p60 | | | 0.091 | −2.944 |
| Average of overall | | | 0.071 | −1.899 |

Table 2 is comparisons between the MVOP and MVC methods with reference to the KTA 2.0 software. The test result in Table 2 shows the offered MVOP method excels the KTA 2.0 software by 1.658% (QCIF)~6.838% (HDTV). The suggested MVOP method shows even better performance in higher definitions. It should be noted that the improved MVOP method always showed the superior performance over the KTA 2.0 software while the MVC method occasionally underperformed in QCIF.

Table 3 presents directly compared superiority of the advanced MVOP that used BDBR and BDPSNR and anchored in the MVC method. The offered MVOP method excels the MVC method by an approximately 1.899%. The performance improved greater in higher definitions. A comparative advantage may be provided with the MVOP method because it may use an optimal PMV without needing additional information signaling for indicating the optimal PMV. The MVC method requires even more extra information to indicate the optimal PMV when the candidate PMV increases in numbers. Therefore, the comparative gain of coding will grow as the number of PMV increases.

In the above aspects of the method, the description is directed to the encoding apparatus adapted to decide for each block either the competing prediction mode or the non-competing prediction mode in performing the encoding operation, and selectively encode the information on the motion prediction mode as the syntax element with respect to just the block to be encoded in the competing prediction mode, and thereafter insert the encoded motion prediction mode information into a preset area (header or trailer) of the upper unit (slice or picture) to transmit the same in bitstream. In addition, the motion prediction mode information is containing the number data of the blocks with their motion prediction modes encoded.

Whereas, the decoding apparatus is described as it processes the information on the motion prediction mode included in the preset area of the upper unit within the bitstream received from the encoding apparatus. Further, it takes the criterion previously agreed with the encoding apparatus in determining in which mode each block was predicted, and performs decoding operation on the block determined to be in the competing prediction mode according to the decoded motion prediction mode information. Then, at complete decoding of all of the blocks included in the upper unit, a comparison was made between the number of the blocks that underwent the decoding according to the decoded motion prediction mode information and the data in the motion prediction mode information received from the encoding apparatus of the number data of the blocks with their motion prediction modes encoded in order to determine if the normal decoding is in process.

However, such method for selectively encoding/decoding the syntax elements is not limited to predicting the motion vectors but may be also applied to encode information for notifying whether to assign one or some of the encoding techniques used for the video encoding for each of the lower units (i.e. units of a block).

For example, the same method for selectively encoding/decoding the syntax elements may be applied to an image encoding with turning on/off a filter for removing noises that are present in encoded images depending on the characteristics of the image. Since the characteristics of an image may generally have high distinctions locally within the image, it is advantageous to perform filtering reflecting the local image characteristics rather than filtering uniformly overall in a certain unit such as within a picture or a slice. However, it is utterly undesirable to make frequent transmissions of the coefficients of the filter used simply by the local image characteristics in the sense of compression efficiency. To resolve this problem in the present disclosure, transmitted are averagely correct filter coefficients by a predetermined unit such as a picture unit or slice unit on the condition that the filter may be turned on or off locally to obtain an appropriate filtering effect throughout the image within the predetermined unit, which is advantageous. In other words, the filtering coefficients are transmitted by predetermined units along with information on whether to turn on/off the filtering locally, which is effective.

At this time, the encoder is adapted to analyze, by predetermined unit by unit, the image belonged to its unit and then obtain an optimal filtering coefficient therefor. Thereafter, for the respective local areas (e.g. blocks) in the predetermined unit, on/off filtering are determined according to a criterion prearranged with the decoding apparatus and is transmitted. At the same time, information is grouped by each predetermined unit on filtering applications to local areas with the filtering decided to be applied or to other local areas with no filtering applied, and an advance transmission is performed of the same as a part of header information in the predetermined unit or the same is transmitted as a part of trailer information in the predetermined unit. Information on the number of the local areas having the on or off filtering decided may be incorporated into the header or the trailer in the predetermined unit.

Whereas, the decoding apparatus decodes the header or the trailer in the predetermined unit and thereby decodes information of the on/off filtering and the number data of the local areas having the on or off filtering decided. Additionally, the decoding apparatus makes a decision on the application of the on/off filtering for each of the local areas, i.e. blocks included in the predetermined unit according to the prearranged criterion, and then applies a filtering coefficient to the local areas with the filtering is decided to be on to perform the decoding. Subsequently, at the completion of decoding all of the local areas included in the upper unit, a comparison may be made between the number of the local areas that underwent the decoding with the filtering coefficient applied and the number data received from the encoding apparatus to be able to determine whether the normal decoding is under progress or an error correction process may be carried out.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes.

Accordingly, the scope of the disclosure is not to be limited by the above aspects but by the claims and the equivalents thereof.

INDUSTRIAL APPLICABILITY

As described above, the present disclosure is highly useful for application in the fields of motion vector encoding or decoding technique and video services or multimedia streaming services to allow the image coding with less bit quantity for providing satisfactions of the services to users who will also find greater expected effect of the disclosure in the wireless mobile environment involving relatively narrow bandwidth, large data loss, and delay.

The invention claimed is:

1. A video decoding method using an inter-prediction, the method comprising:

deriving a motion vector of a current block to be decoded in a current picture;

predicting pixels in the current block using the motion vector of the current block;

extracting quantized transform coefficients by decoding a bitstream;

reconstructing residual signals by inversely quantizing and then inversely transforming the quantized transform coefficients; and adding the predicted pixels and the reconstructed residual signals which correspond to the predicted pixels, wherein the determination of the motion vector of the current block comprises:

obtaining a flag by decoding the bitstream, the flag indicating one among a plurality of modes for determining the motion vector of the current block; and when the flag indicates a first mode among the plurality of modes, performing a process comprising:

deriving a set of candidate motion vectors from motion vectors of a plurality of neighboring blocks of the current block, selecting a candidate motion vector from the set of candidate motion vectors, determining the selected candidate motion vector to be a predicted motion vector of the current block, and reconstructing the motion vector of the current block by adding the predicted motion vector of the current block to a differential vector decoded from the bitstream.

2. The method of claim 1, wherein the plurality of neighboring blocks include at least one block spatially adjacent to the current block in the current picture and at least one block in a reference picture other than the current picture, wherein a position of the at least one block in the reference picture is derived based on a position of the current block in the current picture.

3. The method of claim 2, wherein the position of the at least one block in the reference picture is identical to the position of the current block in the current picture.

4. The method of claim 1, the deriving the set of candidate motion vectors further comprising:

when two elements included in the set have the same value, excluding one of the two elements from the set.

5. The method of claim 1, wherein the candidate motion vector is selected from the set of candidate motion vectors based on information included in the bitstream.

6. The method of claim 1, further comprising:

when the flag indicates a second mode among the plurality of modes, setting the current motion vector of the current block to one among the motion vectors of the plurality of neighboring blocks of the current block.

* * * * *